(12) United States Patent
Hendler et al.

(10) Patent No.: US 8,271,103 B2
(45) Date of Patent: Sep. 18, 2012

(54) AUTOMATED MODEL BUILDING AND MODEL UPDATING

(75) Inventors: Lawrence Hendler, Cupertino, CA (US); Stela Diamant Lazarovich, Herzlia Pituach (IL); Ron Hadar, Cupertino, CA (US); Nouna Kettaneh, Hollis, NH (US); Uzi Levami, Hod Hasharon (IL); Dmitry Perlroizen, Rehovot (IL)

(73) Assignee: MKS Instruments, Inc., Andover, MA (US)

( * ) Notice: Subject to any disclaimer, the term of this patent is extended or adjusted under 35 U.S.C. 154(b) by 1175 days.

(21) Appl. No.: 12/113,613

(22) Filed: May 1, 2008

(65) Prior Publication Data

US 2009/0037013 A1 Feb. 5, 2009

Related U.S. Application Data

(60) Provisional application No. 60/927,219, filed on May 2, 2007.

(51) Int. Cl.
*G05B 13/02* (2006.01)
*G06F 19/00* (2006.01)
*G06F 17/18* (2006.01)
*G06F 11/30* (2006.01)
*G06F 7/00* (2006.01)

(52) U.S. Cl. ......... 700/31; 700/103; 707/779; 707/804; 702/179; 702/183

(58) Field of Classification Search .................. 702/179, 702/183; 700/31, 103; 707/779, 804
See application file for complete search history.

(56) References Cited

U.S. PATENT DOCUMENTS

| | | | |
|---|---|---|---|
| 5,135,688 A | 8/1992 | Nakamura et al. | |
| 5,149,472 A | 9/1992 | Suganuma | |
| 5,173,224 A | 12/1992 | Nakamura et al. | |
| 5,403,433 A | 4/1995 | Morrison et al. | 156/626 |
| 5,408,405 A | 4/1995 | Mozumder et al. | 364/151 |
| 5,442,562 A | 8/1995 | Hopkins et al. | 364/468 |

(Continued)

FOREIGN PATENT DOCUMENTS

DE   101 14 211 A1   11/2001

(Continued)

OTHER PUBLICATIONS

Chen et al., "Plasma Etch Modeling using Optical Emission Spectroscopy," J. Vac. Sci. Technol. A 14(3), May/Jun. 1996, pp. 1901-1906.

(Continued)

*Primary Examiner* — Charles Kasenge
*Assistant Examiner* — Darrin Dunn
(74) *Attorney, Agent, or Firm* — Proskauer Rose LLP

(57) ABSTRACT

A system and computer-implemented method for creating a new model or updating a previously-created model based on a template are described. A template is generated from a previously-created model. The previously-created model specifies a set of parameters associated with a manufacturing process, a process tool or chamber. Variables associated with the manufacturing process are acquired, monitored, and analyzed. A statistical analysis (or multivariate statistical analysis) is employed to analyze the monitored variables and the set of parameters. When any of the monitored variables satisfy a threshold condition, a new model is created or the parameters of the previously-created model are updated, adjusted, or modified based on the template and the monitored variables. A user interface facilitating communication between a user and the systems and display of information is also described.

13 Claims, 22 Drawing Sheets

U.S. PATENT DOCUMENTS

| | | | |
|---|---|---|---|
| 5,469,361 A | 11/1995 | Moyne | 364/468 |
| 5,479,340 A | 12/1995 | Fox et al. | 364/153 |
| 5,544,256 A | 8/1996 | Brecher et al. | 382/149 |
| 5,587,792 A | 12/1996 | Nishizawa et al. | |
| 5,710,700 A | 1/1998 | Kurtzberg et al. | 364/149 |
| 5,786,999 A | 7/1998 | Spahr et al. | |
| 5,815,397 A | 9/1998 | Saito et al. | |
| 5,885,624 A | 3/1999 | Katsuta et al. | |
| 5,900,633 A | 5/1999 | Solomon et al. | 250/339.08 |
| 5,949,678 A | 9/1999 | Wold et al. | 364/188 |
| 5,993,704 A | 11/1999 | Bader | |
| 5,997,778 A | 12/1999 | Bulgrin | |
| 6,090,318 A | 7/2000 | Bader et al. | |
| 6,153,115 A | 11/2000 | Le et al. | 216/60 |
| 6,336,082 B1 | 1/2002 | Nguyen et al. | 702/179 |
| 6,354,145 B1 | 3/2002 | Fransson et al. | 73/61.52 |
| 6,368,883 B1 | 4/2002 | Bode et al. | 438/14 |
| 6,442,445 B1 | 8/2002 | Bunkofske et al. | 700/108 |
| 6,453,246 B1 | 9/2002 | Agrafiotis et al. | 702/27 |
| 6,456,899 B1 | 9/2002 | Gleason et al. | 700/212 |
| 6,528,331 B1 | 3/2003 | Bode et al. | 438/14 |
| 6,556,884 B1 | 4/2003 | Miller et al. | 700/121 |
| 6,564,119 B1 | 5/2003 | Vaculik et al. | 700/146 |
| 6,584,368 B2 | 6/2003 | Bunkofske et al. | 700/83 |
| 6,594,620 B1 | 7/2003 | Qin et al. | 702/185 |
| 6,607,577 B2 | 8/2003 | Vaculik et al. | 75/375 |
| 6,678,569 B2 | 1/2004 | Bunkofske et al. | 700/108 |
| 6,682,669 B2 | 1/2004 | Bulgrin et al. | |
| 6,718,224 B2 | 4/2004 | Firth et al. | 700/121 |
| 6,721,616 B1 | 4/2004 | Ryskoski | 700/108 |
| 6,741,903 B1 | 5/2004 | Bode et al. | 700/121 |
| 6,801,831 B2 | 10/2004 | Sasaki | |
| 6,830,939 B2 | 12/2004 | Harvey et al. | 438/8 |
| 6,839,655 B2 | 1/2005 | Gross et al. | 702/179 |
| 6,876,931 B2 | 4/2005 | Lorenz et al. | 702/22 |
| 6,917,839 B2 | 7/2005 | Bickford | 700/30 |
| 6,967,899 B1 | 11/2005 | O'Brien, Jr. et al. | 367/131 |
| 6,968,253 B2 | 11/2005 | Mack et al. | 700/121 |
| 6,975,944 B1 | 12/2005 | Zenhausern | 702/22 |
| 6,983,176 B2 | 1/2006 | Gardner et al. | 600/310 |
| 7,003,490 B1 | 2/2006 | Keyes | 705/38 |
| 7,031,800 B2 | 4/2006 | Bulgrin | |
| 7,043,401 B2 | 5/2006 | Taguchi et al. | 702/183 |
| 7,062,417 B2 | 6/2006 | Kruger et al. | |
| 7,072,794 B2 | 7/2006 | Wittkowski | 702/179 |
| 7,107,491 B2 | 9/2006 | Graichen et al. | 714/37 |
| 7,151,976 B2 | 12/2006 | Lin | 700/108 |
| 7,189,964 B2 | 3/2007 | Castro-Perez et al. | |
| 7,191,106 B2 | 3/2007 | Minor et al. | 703/2 |
| 7,198,964 B1 | 4/2007 | Cherry et al. | |
| 7,216,005 B2 | 5/2007 | Shioiri et al. | |
| 7,313,454 B2 | 12/2007 | Hendler et al. | 700/110 |
| 7,465,417 B2 | 12/2008 | Hutson et al. | |
| 7,597,827 B2 | 10/2009 | Frey | |
| 7,622,308 B2 | 11/2009 | Hendler et al. | |
| 2002/0038926 A1 | 4/2002 | Vaculik et al. | 266/90 |
| 2002/0143472 A1 | 10/2002 | Mutter | 702/20 |
| 2003/0011376 A1 | 1/2003 | Matsushita et al. | 324/500 |
| 2003/0065462 A1 | 4/2003 | Potyrailo | 702/81 |
| 2003/0144746 A1* | 7/2003 | Hsiung et al. | 700/28 |
| 2003/0182281 A1 | 9/2003 | Wittkowski | 707/5 |
| 2004/0017575 A1* | 1/2004 | Balasubramanian et al. | 356/625 |
| 2004/0055888 A1 | 3/2004 | Wikiel et al. | 205/81 |
| 2004/0064259 A1 | 4/2004 | Haaland et al. | |
| 2004/0064357 A1 | 4/2004 | Hunter et al. | 705/10 |
| 2004/0083065 A1 | 4/2004 | Daniel et al. | |
| 2004/0116814 A1 | 6/2004 | Stranc et al. | 600/473 |
| 2004/0122859 A1 | 6/2004 | Gavra et al. | 707/104.1 |
| 2004/0153815 A1 | 8/2004 | Volponi | 714/37 |
| 2004/0186603 A1 | 9/2004 | Sanford et al. | 700/95 |
| 2004/0215424 A1 | 10/2004 | Taguchi et al. | 702/189 |
| 2004/0225377 A1 | 11/2004 | Kokotov et al. | 700/1 |
| 2004/0228186 A1 | 11/2004 | Kadota | 365/202 |
| 2004/0254762 A1 | 12/2004 | Hopkins et al. | |
| 2004/0259276 A1 | 12/2004 | Yue et al. | |
| 2004/0267399 A1* | 12/2004 | Funk | 700/121 |
| 2005/0028932 A1 | 2/2005 | Shekel et al. | 156/345.15 |
| 2005/0037515 A1 | 2/2005 | Nicholson et al. | 436/173 |
| 2005/0043902 A1 | 2/2005 | Haaland et al. | 702/30 |
| 2005/0045821 A1 | 3/2005 | Noji et al. | 250/311 |
| 2005/0060103 A1* | 3/2005 | Chamness | 702/30 |
| 2005/0130321 A1 | 6/2005 | Nicholson et al. | 436/518 |
| 2005/0234762 A1* | 10/2005 | Pinto et al. | 705/10 |
| 2005/0251276 A1 | 11/2005 | Shen | 700/108 |
| 2005/0268197 A1 | 12/2005 | Wold | 714/746 |
| 2006/0012064 A1* | 1/2006 | Hutson et al. | 264/40.1 |
| 2006/0039598 A1 | 2/2006 | Kim et al. | 382/145 |
| 2006/0058898 A1 | 3/2006 | Emigholz et al. | 700/29 |
| 2006/0111804 A1* | 5/2006 | Lin | 700/110 |
| 2006/0122807 A1 | 6/2006 | Wittkowski | 702/179 |
| 2006/0184264 A1 | 8/2006 | Willis et al. | 700/108 |
| 2007/0021859 A1* | 1/2007 | Lev-Ami et al. | 700/121 |
| 2008/0010531 A1 | 1/2008 | Hendler et al. | 714/33 |
| 2008/0015814 A1* | 1/2008 | Harvey et al. | 702/179 |
| 2008/0082194 A1* | 4/2008 | Samardzija et al. | 700/109 |
| 2008/0082195 A1* | 4/2008 | Samardzija | 700/109 |
| 2008/0125898 A1* | 5/2008 | Harvey et al. | 700/110 |
| 2008/0183311 A1* | 7/2008 | MacArthur et al. | 700/29 |
| 2008/0221720 A1 | 9/2008 | Hendler et al. | 700/109 |
| 2008/0243295 A1* | 10/2008 | Winkler et al. | 700/121 |
| 2009/0055140 A1 | 2/2009 | Kettaneh et al. | |
| 2009/0164171 A1 | 6/2009 | Wold et al. | |
| 2009/0287320 A1 | 11/2009 | MacGregor et al. | |
| 2010/0042231 A1* | 2/2010 | August et al. | 700/31 |
| 2010/0057237 A1 | 3/2010 | Kettaneh et al. | |
| 2010/0191361 A1 | 7/2010 | McCready et al. | |

FOREIGN PATENT DOCUMENTS

| | | |
|---|---|---|
| DE | 100 40 731 A1 | 3/2002 |
| EP | 0 524 317 | 2/1992 |
| GB | 2 394 312 | 11/2001 |
| GB | 2 441 640 | 3/2008 |
| JP | 02-120019 | 5/1990 |
| WO | 03/085504 | 10/2003 |
| WO | 03/103024 | 12/2003 |
| WO | 2004/019147 | 3/2004 |
| WO | 2004/046835 | 6/2004 |
| WO | 2007/046945 | 4/2007 |

OTHER PUBLICATIONS

Gallagher et al., "Development and Benchmarking of Multivariate Statistical Process Control Tools for a Semiconductor Etch Process: Improving Robustness through Model Updating," IFAC ADCHEM'97, 78-83, Banff, Canada, Jun. 1997.

Goodlin et al., "Simultaneous Fault Detection and Classification for Semiconductor Manufacturing Tools," 201$^{st}$ Meeting of the Electrochemical Society, International Symposium on Plasma Processing XIV, Abs. 413, Philadelphia, PA, May 2002, 16 pages.

Goodlin et al., "Simultaneous Fault Detection and Classification for Semiconductor Manufacturing Tools," Journal of the Electrochemical Society, 150 (12), May 12, 2002, pp. G778-G784.

"Hotelling's T squared," Engineering Statistics Handbook [online], Ch. 6.5.4.3, 2 pages [retrieved on Jan. 13, 2006]. Retrieved from the Internet: <URL: http://www.itl.nist.gov/div898/handbook/pmc/section5/pmc543.htm>.

Kresta et al., "Multivariate Statistical Monitoring of Process Operating Performance," The Canadian Journal of Chemical Engineering, vol. 69, Feb. 1991, pp. 35-47.

Jiang et al., "Fault Diagnosis for Batch Processes Based on Improved MFDA," 2005 IEEE International Conference on Systems Man, and Cybernetics, vol. 4, pp. 3420-3425, Oct. 10-12, 2005, IEEE, Piscataway, NJ, (ISBN 0-7803-9298-1).

Lymberopoulos et al., "Advanced Process Control Comes of Age," Semiconductor International [online], 5 pages, Jul. 1, 2004 [retrieved on Nov. 19, 2008]. Retrieved from the Internet: <URL: http://www.semiconductor.net/index.asp?layout=articlePrint&articleID=CA430898>.

Martin et al., "Multivariate Statistical Process Control and Process Performance Monitoring," IFAC Dynamics and Control of Process Systems, 1999, XP-000911903, pp. 347-356.

Mason et al., "Applying Hotelling's $T^2$ Statistic to Batch Processes," J. Quality Technology, vol. 33, No. 4, Oct. 2001, pp. 466-479.

"Pearson's Correlation Coefficient," Teach/Me Data Analysis [online], 2 pages [retrieved on Dec. 9, 2005]. Retrieved from the Internet: <URL: http://www.vias.org/tmdataanaleng/cc_corr_coeff.html>.

"Process Leaps Without New Hardware," EuroAsia Semiconductor [online], Nov. 2004, 3 pages [retrieved on Nov. 19, 2008]. Retrieved from the Internet: <URL http://www.euroasiasemiconductor.com/print_version.php?id=5677>.

Skumanich et al., "Advanced Etch Applications Using Tool-Level Data," Solid State Technology [online], 7 pages [retrieved on Jan. 27, 2005]. Retrieved from the Internet: <URL: http://sst.pennnet.com/articles/article_display.cfm?section=archi&article_id=206470&vers . . . >.

Smith et al., "From Sensor Data to Process Control: A Networked Framework," Semiconductor Manufacturing Magazine, Jul. 2004, 6 pages.

Smith et al., "Practical, Real-Time Multivariate FDC," Semiconductor International [online], Dec. 1, 2004, 6 pages [retrieved on Dec. 16, 2005]. Retrieved from the Internet: <URL: http://www.reed-electronics.com/semiconductor/index.asp?layout=articlePrint&articleID=CA483628>.

Solomon et al., "Real-Time Measurement of Film Thickness, Composition, and Temperature by FT-IR Emission and Reflection Spectroscopy," Semiconductor Characterization: Present Status and Future Needs, AIP Press, 1996, pp. 544-548.

"TOOLweb Blue Box Professional: Enabling High Speed, Multi-User Connectivity and Data Sharing," Control & Information Technology [online], Mar. 2005, 4 pages [retrieved on Nov. 19, 2008]. Retrieved from the Internet: <URL: http://www.mksinst.com/docs/ur/ipcblueds.pdf>.

"TOOLweb Applications Support: AEC/APC Applications Engineering, Integration and Deployment Support," Control & Information Technology [online], Sep. 2005, 4 pages [retrieved on Nov. 19, 2008]. Retrieved from the Internet: <URL: http://www.mksinst.com/docs/UR/TWT3DS.pdf>.

"TOOLweb: APC & e-Diagnostics Suite," Control & Information Technology [online], 4 pages [retrieved on Nov. 19, 2008]. Retrieved from the Internet: <URL: http://www.mksinst.com/docs/ur/twmvads.pdf>.

"TOOLweb SenseLink: Web-Enables Existing Sensors," Control & Information Technology [online], 4 pages [retrieved on Nov. 19, 2008]. Retrieved from the Internet: <URL: http://www.mksinst.com/docs/ur/twsenselinkds.pdf>.

"User's Guide to SIMCA-P, Simca-P+," Umetrics AB, Version 11.0, May 17, 2005, pp. 1-456.

Wang et al., "Process Monitoring in Principal Component Subspace: Part 1. Fault Reconstruction Study," 2004 IEEE International Conference on Systems, Man and Cybernetics, The Hague, The Netherlands, vol. 6, Oct. 10-13, 2004, pp. 5119-5124.

Wold et al., "Hierarchical Multiblock PLS and PC Models for Easier Model Interpretation and as an Alternative to Variable Selection," Journal of Chemometrics, vol. 10, 1996, pp. 463-482.

Wold et al., "Modelling and Diagnostics of Batch Processes and Analogous Kinetic Experiments," Chemometrics and Intelligent Laboratory Systems, vol. 44, Nos. 1-2, 1998, pp. 331-340.

Zhao et al., "A Novel Combination Method for On-Line Process Monitoring and Fault Diagnosis," IEEE ISIE 2005, Dubrovnik, Croatia, Jun. 20-23, 2005, pp. 1715-1719.

Ahmed S. F., A New Approach in Industrial Automation Application "Embedded System Design for Injection Molding Machine," IEEE Xplore, Oct. 29, 2009, 5 pages.

Bai, et al., "IMPOS: A Method and System for Injection Molding Optimization," IEEE Xplore, Oct. 29, 2009, 5 pages.

C. E. Castro, et al., "Multiple criteria optimization with variability considerations in injection molding," *Polymer Engineering and Science*, vol. 47, p. 400, 2007.

C. M. Seaman, et al., "Multiobjective optimization of a plastic injection molding process," *IEEE Transactions on Control Systems Technology*, vol. 2, No. 3, pp. 157-168, 1994.

Chen, et al., "Application of Advanced Process Control in Plastic Injection Molding," IEEE Xplore, Oct. 29, 2009, 6 pages.

Chen, et al., "Injection Molding Quality Control by Integrating Weight Feedback into a Cascade Closed-Loop Control System," Polymer Engineering and Science, 2007, 11 pages.

International Search Report for International Application No. PCT/US2010/021486, Date of Mailing Jul. 5, 2010 (20 pages total).

D. Kazmer and C. Roser, "Evaluation of Product and Process Design Robustness," *Research in Engineering Design*, vol. 11, pp. 20-30, 1999.

D. Kazmer and S. Westerdale, "A model-based methodology for on-line quality control," *Int J Adv Manuf Technol*, vol. 42, pp. 280-292, 2009.

D. Kazmer, "Chapter 13: Quality Control," in *Plastics Manufacturing Systems Engineering*, ed Munich: Carl Hanser Verlag, 2009, pp. 387-418.

D. O. Kazmer, et al., "A Comparison of Statistical Process Control (SPC) and On-Line Multivariate Analyses (MVA) for Injection Molding," *International Polymer Processing*, vol. 23, pp. 447-458, 2008.

Dubay, et al., "An Investigation on the Application of Predictive Control for Controlling Screw Position and Velocity on an Injection Molding Machine," Polymer Engineering and Science, 2007, 10 pages.

Eriksson et al., Multi- and Megavariate Data Analysis: Part I Basic Principles and Applications (2nd. ed.), Umetrics Academy (2006).

Eriksson et al., Multi- and Megavariate Data Analysis: Part II Advanced Applications and Method Extensions (2nd. ed.), Umetrics Academy (2006).

Fugee Tsung, Jianjun Shi, C.F. J. Wu: "Joint Monitoring of PID-Controlled Processes" Journal of Quality Technology, vol. 31, No. 3, Jul. 1, 1999, pp. 275-285, XP002579609.

Fung, et al., "Application of a Capacitive Transducer for Online Part Weight Prediction and Fault Detection in Injection Molding," Polymer Engineering and Science, 2007, 7 pages.

G. Sherbelis, et al., "The Methods and benefits of Establishing a Process Window," in *Proceedings of the 55th Annual Technical Conference, ANTEC*, Part 1 (of 3), 1997, pp. 545-550.

J. W. Mann, "Process Parameter Control: the Key to Optimization," *Plastics Engineering*, vol. 30, pp. 25-27, 1974.

Knights, M., "Injection Mold Balance Unbalanced," Plastics Technology, http://www.ptonline.com/articles/200811fal.html; Nov. 2008, 5 pages.

Li, et al., "A Real-Time Process Optimization System for Injection Molding," Polymer Engineering and Science, 2009, 10 pages.

Li, et al., "Predicting the Parts Weight in Plastic Injection Molding Using Least Squares Support Vector Regression," IEEE Transactions on Systems, Man, and Cybernetics—Part C: Applications and Reviews, vol. 38, No. 6, Nov. 2008, 7 pages.

Liu, et al, "Identification and Autotuning of Temperature-Control System With Application to Injection Molding," IEEE Transactions on Control Systems Technology, vol. 17, No. 6, Nov. 2009, 13 pages.

M. Berins, "Standards for Molding Tolerances," in *SPI Plastics Engineering Handbook of the Society of the Plastics Industy, Inc. (5th Edition)* 5th ed: Kluwer Academic Publishers, 1991, pp. 821-844.

Mei, et al., "The Optimization of Plastic Injection Molding Process Based on Support Vector Machine and Genetic Algorithm," International Conference on Intelligent Computation Technology and Automation, 2008, 4 pages.

N. M. Morris and W. B. Rouse, "The Effects of Type of Knowledge Upon Human Problem Solving in a Process Control Task," *IEEE Transactions on Systems, Man and Cybernetics*, vol. SMC-15, No. 6 pp. 698-707, 1985.

N. Yonehara and I. Ito, "Finding an optimal operation conditions of plastic molding by artificial neural network," *Nippon Kikai Gakkai Ronbunshu, C Hen/Transactions of the Japan Society of Mechanical Engineers, Part C*, vol. 63, pp. 3538-3543, 1997.

P. Knepper and D. Kazmer, "Multi-objective velocity profile optimization," Charlotte, NC, United States, 2006, pp. 1093-1097.

R. H. Myers and D. C. Montgomery, "Response Surface Methodology: Process and Product Optimization Using Designed Experiments," in *Wiley Series in Probability and Statistics*, ed: Wiley Interscience, 1995, p. 248.

R. Ivester, et al., "Automatic tuning of injection molding by the virtual search method," *Journal of Injection Molding*, vol. 2/No. 3, Sep. 1998.

Shu, et al., "PID Neural Network Temperature Control System in Plastic Injecting-moulding Machine," Third International Conference on Natural Computation, 2007, 5 pages.

State space (controls), State space (controls)—Wikipedia, the free encyclopedia [online], 11 pages [retrieved on Sep. 14, 2010]. Retrieved from the Internet: <URL: http://en.wikipedia.org/wiki/State_Space_(controls)>.

Tan et al., "Adaptive Control of Ram Velocity for the Injection Moulding Machine," IEEE Transactions on Control Systems Technology, vol. 9, No. 4, Jul. 2001, 9 pages.

Triefenbach, F., "Design of Experiments: The D-Optimal Approach and Its Implementation As a Computer Algorithm," Bachelor's Thesis in Information and Communication Technology, Jan. 15, 2008, 84 pages.

Wold et al., "2.10 Batch Process Modeling and MSPC," in Comprehensive Chemometrics: Chemical and Biochemical Data Analysis, (Brown et al. Eds.), Oxford, UK: Elsevier, 37 pages (2009).

Yang J. H., "Nonlinear Adaptive Control for Injection Molding Machines," IEEE Xplore, Oct. 29, 2009, 6 pages.

You et al., "Research on Temperature Measure and Control Method in Mold-Temperature-Control Solidification," IEEE International Conference on Control and Automation WeCP-18, Guangzhou, China—May 30 to Jun. 1, 2007, 4 pages.

* cited by examiner

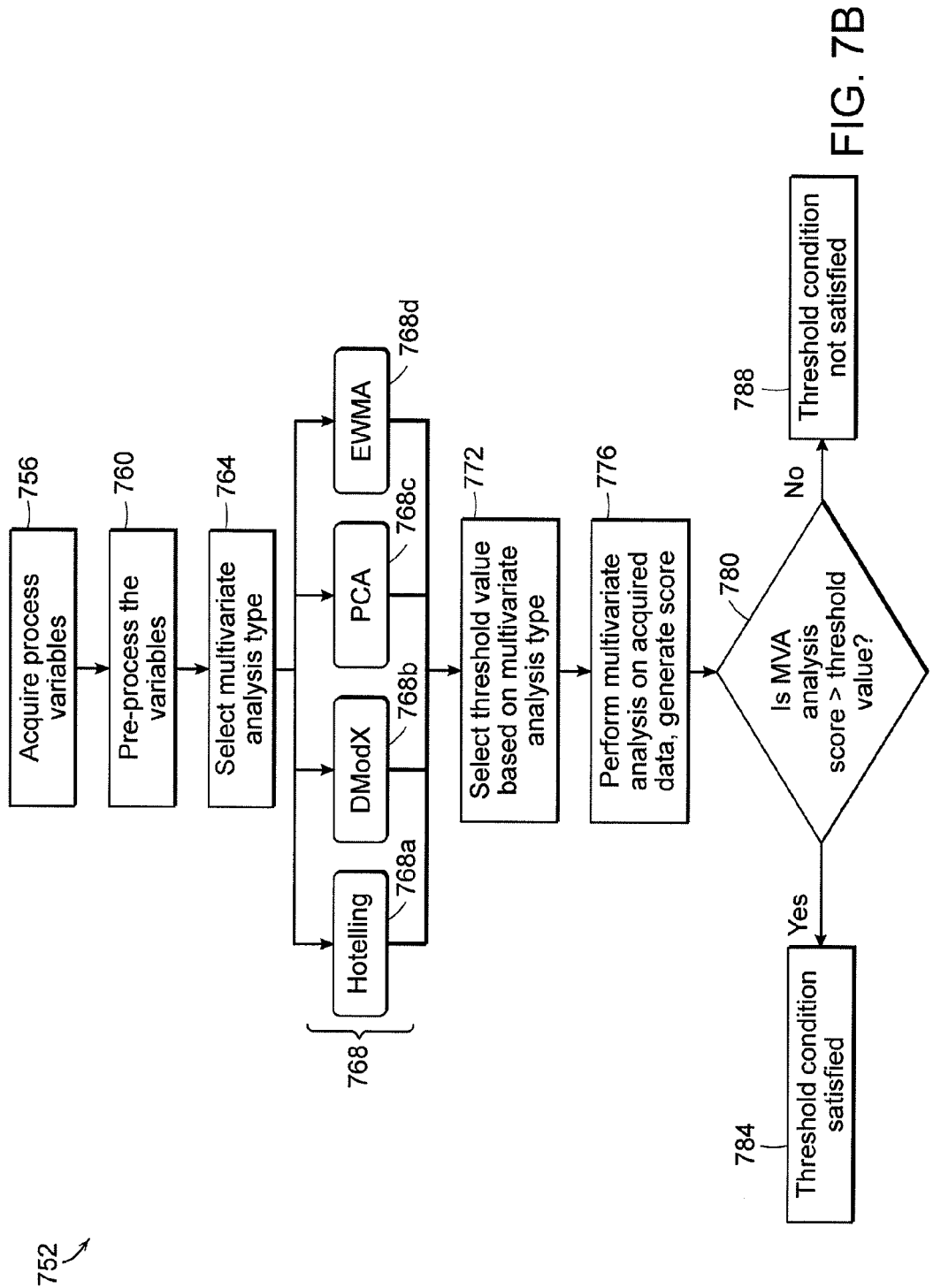

AUTOMATED MODEL BUILDING AND MODEL UPDATING

CROSS-REFERENCE TO RELATED APPLICATIONS

This application claims the benefit of U.S. Patent Application No. 60/927,219, titled "Automated Model Building and Model Updating" by Lazarovich et al., filed May 2, 2007, the entire contents of which are hereby incorporated herein by reference.

TECHNICAL FIELD

The invention relates generally to manufacturing processes and particularly to automated model building and model updating based on a template.

BACKGROUND

In the semiconductor device manufacturing industry, device manufacturers have managed to transition to more closely toleranced process and materials specifications by relying on process tool manufacturers to design better and/or faster process and hardware configurations. However, as device geometries shrink to the nanometer scale, complexity in manufacturing processes increases, and process and material specifications become more difficult to meet.

A typical process tool used in current semiconductor manufacturing can be described by a set of several thousand process variables. The variables are generally related to physical parameters of the manufacturing process and/or tools used in the manufacturing process. In some cases, of these several thousand variables, several hundred variables will be dynamic (e.g., changing in time during the manufacturing process or between manufacturing processes). The dynamic variables, for example, gas flow, gas pressure, delivered power, current, voltage, and temperature change based on, for example, a specific processing recipe, the particular step or series of steps in the overall sequence of processing steps, errors and faults that occur during the manufacturing process or changes in parameter values based on use of a particular tool or chamber (e.g., referred to as "drift").

One way to control the manufacturing process is to specify a set of model output values that defines the values of ideal parameters occurring during the manufacturing process. The actual output values of the manufacturing process are then compared to the model output values to determine if the actual output values are consistent with the model output values. This comparison is performed manually by a process engineer to determine whether the particular output (e.g., processed semiconductor wafers) have desirable properties.

Generally, the process engineer specifies or generates the model that includes the parameters for the process tool that will be used during wafer processing. The model specifies the various operating parameters used during the manufacturing process to generate a particular type of wafer output. The model is typically based on inspection of wafers by the process engineer and a determination of acceptable parameters based on the output of the process tool and the experience of the process engineer. After a particular process tool or chamber undergoes preventive or periodic maintenance, the values for acceptable parameters can change. A change in acceptable parameters generally requires the process engineer to manually re-specify the acceptable parameters for the particular tool or chamber, e.g., to re-create or re-enter the parameters of the model.

Creating a model in this manner is a relative lengthy and labor-intensive process, sometimes taking up to an hour or more. Additionally, the creation of a model requires the expertise or experience of a process engineer, which can lead to a certain percentage of faulty wafers based on human error or inconsistency in acceptable parameters between maintenance operations. Moreover, updating a model requires a similar labor-intensive process. A model may be updated as part of a periodic maintenance plan and/or in response to changes within the particular process tool. Updating the model typically requires adjustment or re-specification of the process parameters. The process engineer is typically involved in manually adjusting the parameters. The updated model takes approximately the same amount of time to update as a model created for the first time.

SUMMARY

There is a need for faster and more consistent creation and updating of models. There is a further need to reduce the amount of manual input required from human personnel such as a process engineer in creating and updating models. As used herein, "create," "build," or "generate" and variants thereof are used interchangeably.

The invention described herein relates to a process and system for automated model creation from a model template and automated model updates based on the template, thereby reducing the time associated with creating or updating a model. Creating or updating a model from a model template further reduces, over time, the involvement required by a process engineer and improves the consistency of created and updated models. Described are systems and methods for generating, building, creating, or updating models using statistical analysis or mathematical principles. Data from a manufacturing process is used in a statistical analysis to trigger a template to generate or update a model.

Generally, a model is used to specify the value of parameters of a manufacturing process and also used to define a template. The value of the parameters can be considered input data. During the manufacturing process, output data is measured and compared to the input data from the model. Output data is measured by monitoring the variables and/or values of various manufacturing or process parameters. The output data can be compared to the input data using statistical analysis, for example, a multivariate analysis. Examples of multivariate analysis include Hotelling-type calculations, DModX-type calculations, principal component analysis-type calculations, weighted moving average-type calculations (such as an exponentially weighted moving average), or any combination of these. If the result of the statistical analysis satisfies a user-defined condition, a new model is created or the existing model is updated using a model template and output data (e.g., data from a particular process tool or from a particular manufacturing process). In some embodiments, a model for a particular process tool or chamber can be generated from a template previously generated for the same process tool or chamber. In some embodiments, a model for a particular process tool or chamber can be generated from a template previously generated from a different process tool or chamber. For example, the template can be used to generate a model for a different tool or chamber of the same type of tool or chamber used to generate the template or previous models.

In some embodiments, the invention employs computer software and hardware to implement to processes and systems described herein. The invention, in some illustrative embodiments, also includes one or more user interfaces that allow a user to specify values for various parameters used by the system for the manufacturing process.

In general, in a first aspect, the invention relates to a computer-implemented method for creating a new model. The method involves generating a template from a previously-created model where the previously-created model specifies a first set of parameters associated with a manufacturing process. The method involves monitoring one or more variables associated with the manufacturing process and analyzing the monitored variables and the first set of parameters according to a multivariate statistical analysis. Upon any of the variables satisfying a threshold condition, a new model is created based on the template and the one or more variables.

In some embodiments, the method involves generating a second template from the new model. The method can involve creating a second new model from the template when any of the variables satisfies a threshold condition. The variables to be monitored and/or the threshold condition can be specified by a user. In some embodiments, any of the variables satisfying the threshold condition triggers creating the new model. Examples of the monitored variables include time, occurrence of periodic or preventive maintenance, a result of metrology verification, the number of wafers processed, or some combination of these variables.

Some embodiments feature the variables satisfying the threshold condition when the multivariate statistical analysis of the variables results in a value that exceeds a threshold value. The multivariate statistical analysis can involve a Hotelling-type calculation, a DModX-type calculation, a principal component analysis-type calculation, a weighted moving average-type calculation, or a combination of these calculations. In some embodiments, creating the new model involves modifying the first set of parameters of the previously-created model based in part on the template and the value of the one or more variables monitored during the manufacturing process satisfying the threshold condition. Modifying the first set of parameters can involve specifying a second set of parameters or changing one or more values of each of the first set of parameters (or both). The template and/or the new model can specify parameters for the process tool, chamber or recipe from which the variables were monitored or for a second process tool, chamber, or recipe.

In another aspect, the invention relates to a multivariate analytical system. The system includes a processor and a template-generating module that is in communication with the processor to generate a first template based on a previously-created model that includes a first set of parameters that define at least a portion of a manufacturing process. The system includes a data acquisition module in communication with a processing tool to acquire or monitor one or more variables during the manufacturing process and to provide information associated with the variables to a model-generating module. The system also includes the model-generating module to generate a new model having a second set of parameters. The new model is generated according to a statistical analysis based on the first template and the one or more variables upon the one or more variables satisfying a threshold condition.

The first set of parameters features, in some embodiments, any of the following: metrology, time, duration of use of a process tool, number of wafers processed, occurrence of periodic or preventive maintenance, sequence of wafers processed, or a combination of these. The system can include a basket or cache module to provide data to the model-generating module or the template-generating module in response to a user selection or any of the one or more variables satisfying the threshold condition. In some embodiments, the new model is associated with the previously-created model, and the second set of parameters is associated with the first set of parameters adjusted based on the template and/or the variables.

The system can include a user interface. The user interface includes a first area that includes one or more fields available for input of information by a user. The information can include a value of a parameter of the template, and the first area can include a command portion in communication with the template-generating module for issuing a command to create the template in response to the user selecting the command portion. The user interface includes a second area that displays one or more unique identifiers associated with each of a set of wafers that have one or more data values. The unique identifiers are selectable by the user. The user interface includes a third area for displaying a subset of the unique identifiers that correspond to a subset of wafers selected by the user. The user interface can include a fourth area in communication with the model-generating module for at least one of creating the new model or updating the previously-created model in response to the user selecting the fourth area. The new model can be created or the previously-created model updated according to a statistical analysis based on the template and the data values associated with the subset of wafers. The user interface features, in some embodiments, a fifth area that has one or more conditions selectable by the user where the fifth area is in communication with an analyzer module and the model-generating module for communicating a signal to the model-generating module to create the new model or update the previously-created model upon a determination that the conditions have been satisfied.

In some embodiments, the statistical analysis is a multivariate statistical analysis. The multivariate statistical analysis involves, in some embodiments, a Hotelling-type calculation, a DModX-type calculation, a principal component analysis-type calculation, a weighted moving average-type calculation, or a combination of these.

In another aspect, the invention relates to a computer-implemented method for monitoring a manufacturing process. The method involves providing a model specifying a set of parameters associated with the manufacturing process. The method also involves associating a user-selected condition with the model, where the condition includes a set of user-definable expressions and a user definable consequence. The method involves monitoring one or more variables associated with the manufacturing process and modifying the model based on the consequence upon any of the monitored variables satisfying at least one expression from the set of expressions.

Some embodiments feature the model being modified upon satisfaction of all of the set of user-definable expressions. Modifying the model can involve at least one of changing an alarm limit of the model, generating a new model, updating the set of parameters specified by the model, creating a special alarm message, determining not to trigger a fault condition, or a combination of these. An example of changing an alarm limit of the model involves changing a value of at least one of a $T^2$-type score, a DModX-type score, a principal component analysis-type score, a weighted moving average-type score, or any combination of these scores.

In another aspect, the invention relates to a system for creating or updating a model of a manufacturing process according to a statistical analysis. The system includes a processor means and a user interface means that allows a user to communicate with the processor means. The user interface means has a first area to display one or more user-selectable models and a second area having one or more user-configurable conditions. The system includes a control means in communication with the first area of the user interface means for determining an initial value for each of one or more parameters of a manufacturing tool based on a particular user-selected model. The system includes an analyzer means in communication with the second area of the user interface to monitor output values associated with the parameters of the manufacturing tool and to determine whether the user-configurable conditions have been satisfied. The system includes a model-modification means in communication with the analyzer means for updating the model or creating a new model upon the user configurable conditions being satisfied. The updated or new model is based in part on the user-selected model and on the output values.

In some embodiments, any of the above aspects can involve any of the described in embodiments or advantages.

BRIEF DESCRIPTION OF THE DRAWINGS

FIGS. 5A-5G are plan views of an exemplary user interface and process facilitating user configuration of one or more threshold conditions.

FIG. 7B is a flow chart illustrating a process for determining whether a threshold condition is satisfied.

DETAILED DESCRIPTION

Figure 1:
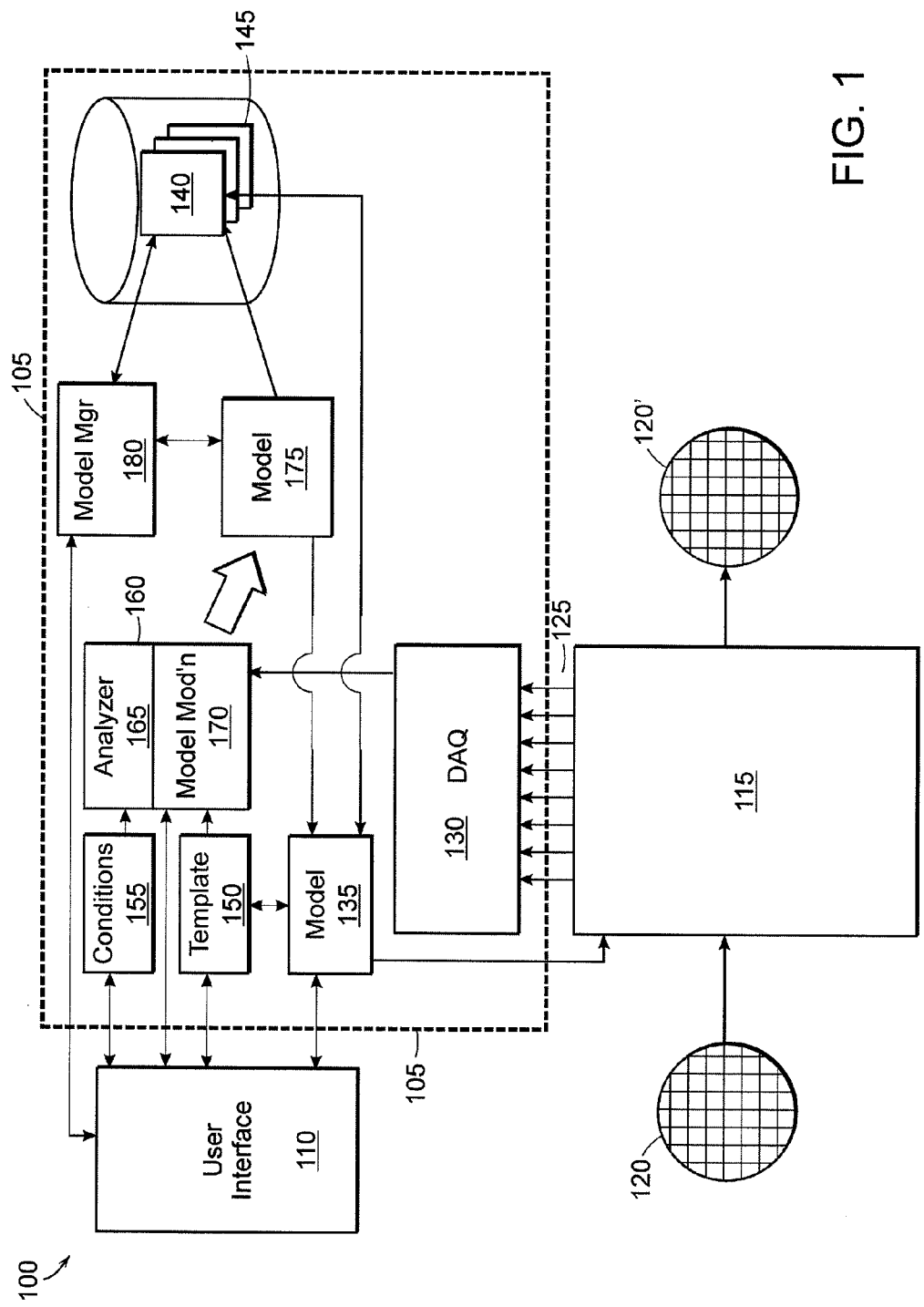
FIG. 1 is a block diagram of an exemplary system that embodies the invention.

FIG. 1 is a block diagram of an exemplary system 100 that embodies the invention. The system 100 includes a processor 105 and a user interface 110. The user interface 110 can include a computer keyboard, mouse, other haptic interfaces, a graphical user interface, voice input, or other input/output channel for a user to communicate with the processor 105, for example, in response to stimuli from the processor 105. The user interface 110 can include a display such as a computer monitor. The processor 105 is coupled to a processing facility 115. The processing facility 115 performs manufacturing operations for performing wafer processing functions on wafer 120 and outputting a processed wafer 120'. The processing facility 115 can include tools or processes (not shown) for, for example, cleaning wafers, depositing material on wafers, removing material from wafer surfaces, and performing other functions within the processing facility 115.

In some embodiments, the tools or processes include multiple stations or units within the facility 115. The functions performed by the tools or processes can be associated with a plurality of physical parameters, for example, gas pressure, gas flow rate, temperature, time, and/or plasma concentration among many others. In some embodiments, the parameter is the yield loss of the particular wafer 120 that occurs after processing. The physical parameters can be monitored and manipulated to produce a plurality of outputs 125 containing data about the variables (e.g., the physical parameters and/or tool operating conditions) in the processing facility 115. The outputs 125 can be electrical, optical, magnetic, acoustic, or other signals capable of transmitting the data (or information about the data) or being transmitted to or within the processor 105. Although the system 100 is described in the context of processing the wafer 120, it will be understood that other manufacturing processes are contemplated and within the scope and spirit of the invention, for example, any batch manufacturing processes within the biotechnology or pharmaceutical industries. In such examples, the particular physical parameters and/or tool operating conditions vary depending on the particular process or product of interest.

The processing facility 115 is coupled to the processor 105 by a data acquisition module 130. The data acquisition module 130 receives the outputs 125 from the processing facility 115. In some embodiments, the data acquisition module 130 performs buffering, multiplexing, signaling, switching, routing, formatting, and other functions on the data to put the data in a format or condition for suitable communication or retransmission to other modules of the processor 105 (e.g., pre-processing functions). In some embodiments, pre-processing functions are performed by a different module (not shown). In some embodiments the data acquisition module 130 receives process data from the database 140, which can include, for example, data about previously-manufactured wafers.

The particular processes that occur within the processing facility 115 can be controlled by the processor 105 via information from the model 135, for example, via a run-to-run controller (not shown). The run-to-run controller can be a module within the processor 105 or a controller (not shown) external to the processor 105. In some embodiments, a model 135 is associated with various process parameters within the processing facility 115, and the model 135 specifies desirable or ideal values for the process parameters. The values of the process parameters can vary depending on several factors, for example, the order and type of processes occurring in the processing facility 115 or the particular recipe used to process the wafer 120. The actual values of the processing parameters within the processing facility 115 are measured by and/or communicated to the data acquisition module 130 by the plurality of outputs 125. The measured values of the processing parameters are compared to the parameters specified by the model 135, as discussed in more detail below.

In some embodiments, the user interface 110 can be used to manually create the model 135 within the processor 105. In such embodiments, a user specifies the values of each of the process parameters or variables to be used within the processing facility 115, which can be a labor- and time-intensive process. The model 135 can be saved in a database 140 within the processor 105 with a plurality of other models 145. In such embodiments, creation of a new model (not shown) or updating an existing model 135 involves the user manually re-specifying the new or updated values for the process parameters or variables. In some embodiments, if the user manually creates the model 135, future models are also manually created by the user. The user also has the option of generating a template 150 when the user manually creates the model 135. The template 150 can be, for example, a data file containing instructions or commands to be applied to a particular set of measured data to generate the model 135. An advantage realized by using the template 150 is that after the template 150 has been generated, the model 135 can be subsequently used and/or modified automatically by applying the instructions or commands in the template 150 to a set of measured data, resulting in a new or updated model 175. In some embodiments, the new or updated model 175 is based on a statistical analysis of wafer data acquired during manufacturing. The use of the template 150 can reduce the amount of labor and expertise required by a process engineer to generate the model 135. In addition to specifying the instructions or commands of the template 150, the user can specify conditions that, when met, trigger the model 135 to be used or updated.

An advantage of the system 100 includes the use of the template 150. The template 150 can be generated by a command received from the user interface 110, for example, when the user defines a new model 135 manually. A template-generating module (not shown) generates the template 150 based on the model 135 and/or based on data from the data acquisition module 130. For example, the user can select one or more wafers 120' with desirable properties after processing, and the values of process parameters communicated by the plurality of outputs 125 during the processing of such wafers can be used to generate the template 150. This allows the template 150 to incorporate data from previously-processed wafers, for example, conditions within a tool or chamber in the processing facility 115, previous processes or recipes, or results of measurement (e.g., metrology). In some embodiments, the template 150 incorporates this information implicitly by using previous wafer data to generate the new model 175. In some embodiments, information about previous processing can be specified by the user (e.g., via the user interface 110). In some embodiments, the template 150 is selected from a set of previously-defined templates (not shown) via the user interface 110. The previously-defined templates can be stored in the database 140 or in a different database (not shown).

The user interface 110 can also be used to specify one or more conditions 155 in the processor 105. Generally, the conditions 155 represent rules relating to threshold values of process parameters. The system 100 can make a determination regarding the quality of the wafers 120' when the process parameters output by the processing facility 115 satisfy the threshold values or rules specified by the conditions 155. For example, the conditions 155 can be used to adjust the response of the model 135 to differentiate the desirable and undesirable output (e.g., wafers 120') for the same working parameters based on, for example, the circumstances or existing operating conditions during the processing of the wafer 120. In some embodiments, the wafer 120' is considered a bad wafer when the measured parameters fall outside of acceptable limits specified by the model 135 or the conditions 155. Data can move bi-directionally through the system 100 (e.g., between various components of the system), and can include feed-forward transmission of data or feed-backward transmission of data.

In general, the user specifies conditions 155 that are implemented using a domain-specific language to simplify complex Boolean operations. In some embodiments, the conditions 155 can have two parts, a "when" part and a "then" part. The "when" part specifies the appropriate time for an action or what information should be true for the "then" part to be activated. The "then" part can represent complex Boolean operations or can be used to signal an expression. In some embodiments, an expression is associated with any of the wafer 120, chamber in the processing facility 115, a multivariate model (e.g., the model 135), a multivariate analysis, metrology or any combination thereof.

The processor 105 includes a module 160 that includes an analyzer module 165 and a model-modification module 170. The module 160 receives information or data from the template 150 and the conditions 155. For example, the analyzer module 165 receives data about the manufacturing process used on wafer 120 to produce wafer 120' from the data acquisition module 130. The analyzer module 165 can determine whether the processing facility 115 satisfies the threshold conditions 155 specified by the user based on the acquired data (e.g., by comparing the acquired data to the model data using, for example, multivariate analytical tools). The analyzer module 165 can communicate this information to other modules in the processor 105. The model-modification module 170 receives information or data from the template 150, the analyzer module 165, and/or the data acquisition module 130. The analyzer module 165 communicates to the model-modification module 170 when one or more user specified conditions 155 have been satisfied, which triggers the model-modification module 170 to update the model 135 or generate a new model 175 based on the data from the processing facility 115 or the data acquisition module 130. The model modification module 170 updates the model 135 by changing the values of the parameters (e.g., desirable wafer properties) stored in the model 135. The model modification module 170 generates a new model 175 by generating a data structure based on parameters stored in the template 150 and based on the acquired data.

In some embodiments, the conditions 155 include information about the particular wafer 120 being processed, referred to as wafer expressions Examples of such conditions 155 include "Wafer Context," "VID Maximum," "VID Minimum," "VID Average," "VID Standard Deviation," or "VID Transient." As used herein, "VID" generally refers to a "variable identification," where the variable represents the value of a real-world observable occurring during the manufacturing process or with respect to a process tool. Table 1 below illustrates wafer expressions along with the description of the particular expression and the syntax of the particular condition used by the analyzer module 165. The syntax includes the type of parameter used by the analyzer module 165. Table 2 below illustrates the types of parameters referred to in Table 1, the source of the parameter, and a description of the parameter.

TABLE 1

Wafer Expressions

| Condition Name | Description | Syntax |
| --- | --- | --- |
| Wafer Context | Matches a wafer context parameter using a "regular expression" | {waferContextParameter} matches {regularExpression} |
| VID Maximum | Evaluates maximum value of specified VID using arithmetical operation | Maximum of {vidName} during {steps} is {operator} than {number} |
| VID Minimum | Evaluates minimum value of specified VID using arithmetical operation | Minimum of {vidName} during {steps} is {operator} than {number} |
| VID Average | Evaluates average value of specified VID using arithmetical operation, for example, mean, median or mode | Average of {vidName} during {steps} is {operator} than {number} |
| VID Standard Deviation | Evaluates standard deviation value of specified VID using arithmetical operation | Standard deviation of {vidName} during {steps} is {operator} than {number} |
| VID Transient | Evaluates transient value of specified VID in a particular wafer | Transient of {magnitude} per {duration} {time} in {vidName} during {steps} |

TABLE 2

Parameters of Wafer Expressions

| Parameter Name | Source | Description |
|---|---|---|
| waferContextParameter | Template 150 | Names the wafer context parameter, e.g., lot name, slot name, recipe name, chamber name |
| regularExpression | User Interface 110 | Identifies, e.g., as a text string, the wafer context parameter |
| vidName | Template 150 | Names the variable or VID |
| steps | Template 150 | Identifies the steps used in calculation, e.g., by comma separated list; empty list refers to all steps |
| operator | Template 150 | Identifies arithmetical operation, for example, "greater," "less," "greater or equal," or "less or equal" |
| number | User Interface 110 | Numerical scalar value |
| magnitude | User Interface 110 | Identifies magnitude of the transient detected as a numerical value |
| duration | User Interface 110 | Identifies duration of the period during which transients are detected |
| time | User Interface 110 or Template 150 | Identifies a unit of time, e.g., milliseconds or microseconds |

In some embodiments, the conditions 155 include information about the particular processing tool or chamber in the facility 115 in which the wafer 120 is processed, referred to as chamber expressions Examples of such conditions 155 include "Chamber IDLE State," "Chamber Post-IDLE State," "Chamber Preventive or Periodic Maintenance," or "Chamber Post Preventive or Periodic Maintenance." Table 3 below illustrates chamber expressions along with the description of the particular expression and the syntax of the particular condition used by the analyzer module 165. The syntax includes the type of parameter used by the analyzer module 165. Table 4 below illustrates the types of parameters referred to in Table 3, the source of the parameter, and a description of the parameter.

TABLE 3

Chamber Expressions

| Condition Name | Description | Syntax |
|---|---|---|
| Chamber IDLE State | Determines whether a particular processing tool or chamber has not been used for an amount of time | Chamber is IDLE more than {number} {time} |
| Chamber Post-IDLE State | Determines whether a particular processing tool or chamber is being used after being in the IDLE state and allows a specification of the duration of the post-IDLE state in terms of the number of wafers processed | Chamber processed less than {number} wafers after IDLE state |
| Chamber Preventive or Periodic Maintenance | Determines whether a particular processing tool is being used after preventive or periodic maintenance for a period of time | Chamber is in use for at least {number} {time} |
| Chamber Post-Preventive or Periodic Maintenance | Determines whether a particular processing tool or chamber is being used after preventive or periodic maintenance in terms of the number of wafers processed | Chamber processed less than {number} wafers after preventive or periodic maintenance |

TABLE 4

Parameters of Chamber Expressions

| Parameter Name | Source | Description |
|---|---|---|
| number | User Interface 110 | Numerical scalar value |
| time | User Interface 110 or Template 150 | Identifies a unit of time, e.g., microseconds to hours or days |

In some embodiments, the conditions 155 include information about the particular template 150 or multivariate model 135 used to process the wafer 120, referred to as multivariate model expressions Examples of such conditions 155 include "VID Statistic-Maximum," "VID Statistic-Minimum," "VID Statistic-Average," and "VID Statistic-Standard Deviation." Table 5 below illustrates multivariate model expressions along with the description of the particular expression and the syntax of the particular condition used by the analyzer module 165. The syntax includes the type of parameter used by the analyzer module 165. Table 6 below illustrates the types of parameters referred to in Table 5, the source of the parameter, and a description of the parameter.

TABLE 5

Multivariate Model Expressions

| Condition Name | Description | Syntax |
|---|---|---|
| VID Statistic-Maximum | Evaluates a maximum value of a variable or VID against the particular multivariate model 135 being used | Maximum of {vidName} during {steps} is {operator} than {model value} |
| VID Statistic-Minimum | Evaluates a minimum value of a variable or VID against the particular multivariate model 135 being used | Minimum of {vidName} during {steps} is {operator} than {model value} |
| VID Statistic-Average | Evaluates average value of variable or VID against the particular multivariate model 135 being used | Average of {vidName} during {steps} is {operator} than {model value} |
| VID Statistic-Standard Deviation | Evaluates standard deviation of variable or VID against the particular multivariate model 135 being used | Standard deviation of {vidName} during {steps} is {operator} than {model value} |

TABLE 6

Parameters of Multivariate Model Expressions

| Parameter Name | Source | Description |
|---|---|---|
| vidName | Template 150 | Names the variable or VID |
| steps | User Interface 110 | Identifies the steps used in calculation, e.g., by comma separated list; empty list refers to all steps |
| operator | Template 150 | Identifies arithmetical operation, for example, "greater," "less," "greater or equal," or "less or equal" |
| model value | Model 135 | Identifies value from Model 135 for comparison or analysis |

In some embodiments, the conditions 155 include information about the results of multivariate statistical analyses performed on data measured during processing of the wafer 120, referred to as multivariate analysis expressions. Examples of such conditions 155 include "Multivariate Upper Level Results," and "Fault Classification." Table 7 below illustrates multivariate analysis expressions along with the description of the particular expression and the syntax of the particular condition used by the analyzer module 165. The syntax includes the type of parameter used by the analyzer module 165. Table 8 below illustrates the types of parameters referred to in Table 7, the source of the parameter, and a description of the parameter.

TABLE 7

Multivariate Analysis Expressions

| Condition Name | Description | Syntax |
| --- | --- | --- |
| Multivariate Analysis Upper Level Results | Evaluates predicted values of predefined multivariate statistical analyses during upper level analysis | {mvaParameter} is {operator} than {number} |
| Classification | Determines a fault classification is a fault occurs or is detected | Fault class is {faultClass} |

TABLE 8

Parameters of Multivariate Analysis Expressions

| Parameter Name | Source | Description |
| --- | --- | --- |
| mvaParameter | Model 135 or Template 150 | Identifies the particular multivariate analysis to be used, for example, $T^2$ or Hotelling analysis, DModX analysis, principal component analysis ($t_1/t_2$), weighted moving average and/or exponentially weighted moving average calculations |
| operator | Model 135 or Template 150 | Identifies arithmetical operation, for example, "greater," "less," "greater or equal," or "less or equal" |
| number | User Interface 110 | Numerical scalar value |
| faultClass | Model 135 or Template 150 | Identifies a type of fault when a fault condition is satisfied. |

In some embodiments, the conditions 155 include information relating to the system's 100 knowledge or a user's knowledge of metrology. Examples of such conditions 155 include "Pre-processing metrology parameters." Table 9 below illustrates metrology expressions along with the description of the particular expression and the syntax of the particular condition used by the analyzer module 165. The syntax includes the type of parameter used by the analyzer module 165. Table 10 below illustrates the types of parameters referred to in Table 9, the source of the parameter, and a description of the parameter.

TABLE 9

Metrology Expressions

| Condition Name | Description | Syntax |
| --- | --- | --- |
| Pre-processing metrology parameters | Evaluates pre-processing metrology parameter | {metrologyParameter} measured by {metroTool} is {operator} than {number} |

TABLE 10

Parameters of Metrology Expressions

| Parameter Name | Source | Description |
| --- | --- | --- |
| metrologyParameter | Model 135 or Template 150 | Identifies the particular metrology parameter to be used |
| metroTool | Model 135 or Template 150 | Identifies the particular metrology tool performing the pre-processing measurement |
| operator | Model 135 or Template 150 | Identifies arithmetical operation, for example, "greater," "less," "greater or equal," or "less or equal" |
| number | User Interface 110 | Numerical scalar value |

In some embodiments, additional types of expressions for conditions are used. Other types of expressions can be employed depending on the user's preference. For example, a user can specify that no data be collected for a particular wafer 120 or batch of wafers (e.g., the first batch after preventive or periodic maintenance) or that data collected for subsequent batches of wafers (e.g., the second and third batches after maintenance) be collected subject to parameters (e.g., parameters associating a weight with the collected data). Such a configuration reduces the effect of skewed results based on chamber or tool maintenance. Other expressions can also be used to account for normal "drift" or changes in chamber or tool parameters. For example, the age of a chamber or tool or the duration between occurrences of preventive or periodic maintenance on a particular chamber or tool can be used for collecting data or generating the model 135. Additionally, the number of wafers processed can be specified as a parameter alone, or in combination with, for example, the age of a chamber or tool. Other parameters and the use thereof are within the scope of the invention.

In some embodiments, a new model 175 is generated using the template 150 and/or data acquired during wafer processing in the processing facility 115. For example, the data acquired can be compared to previously acquired data and used to specify values for parameters used for the new model 175. In some embodiments, the model 135 is updated by adjusting or changing the values of parameters used in the model 135. For example, data acquired during wafer processing can be compared to data used to specify values for parameters in the model, and the values of the parameters can be adjusted using a statistical analysis that accounts for both types of data but statistically weights the acquired data more heavily. In some embodiments, the statistical weighting analysis is a multi-variate analysis.

In some embodiments, the values of parameters used in the model 135 are updated using an exponentially weighted moving average (also called "EWMA") process. Data acquired during processing is compared using EWMA to data used to create or update the model 135. Generally, EWMA estimates a rate of change of data between the wafer 120 and subsequent wafers (not shown) and uses the rate to modify the model 135 to account for or address acceptable changes between wafers. EWMA weights the data acquired more recently in time more heavily than data acquired more remotely in time (e.g., the data used to specify parameters in the previous model). In some embodiments, the initial model 135 is randomly-generated, and the EWMA process is used to update the parameter values of the randomly-generated model 135. In such embodiments, the values of parameters specified in the model 135 are adjusted relatively dramatically in the first update to reduce the effects of the randomly-generated original model because the more recently-acquired data is representative of the state of the particular tool or chamber in the processing facility 115. Data associated with the randomly-generated model 135 is devalued relatively quickly as more data is acquired. In such embodiments, the initial model 135 is required but devalued or discarded quickly because the updated model 135 represents a convergence of parameter values to reflect real-world operating conditions after multiple iterations of data acquisition and model updates.

The system also includes a model management module 180 in communication with the user interface 110 and the database 140. The model management module 180 facilitates storage and retrieval of the plurality of models 145 (including the model 135 as updated or the new model 175) in response to user commands received via the user interface 110 for use by other modules in the processor 105.

Although the embodiments described herein relate to a batch-type process (e.g., semiconductor wafer processing, pharmaceutical dose processing or biotechnology sequencing or processing), it will be understood that the processing and analysis techniques can also be applied to continuous-type processes, for example, pipeline flow, refinery processes, or other processes without well-defined start/stop times and/or events.

Figure 2A:
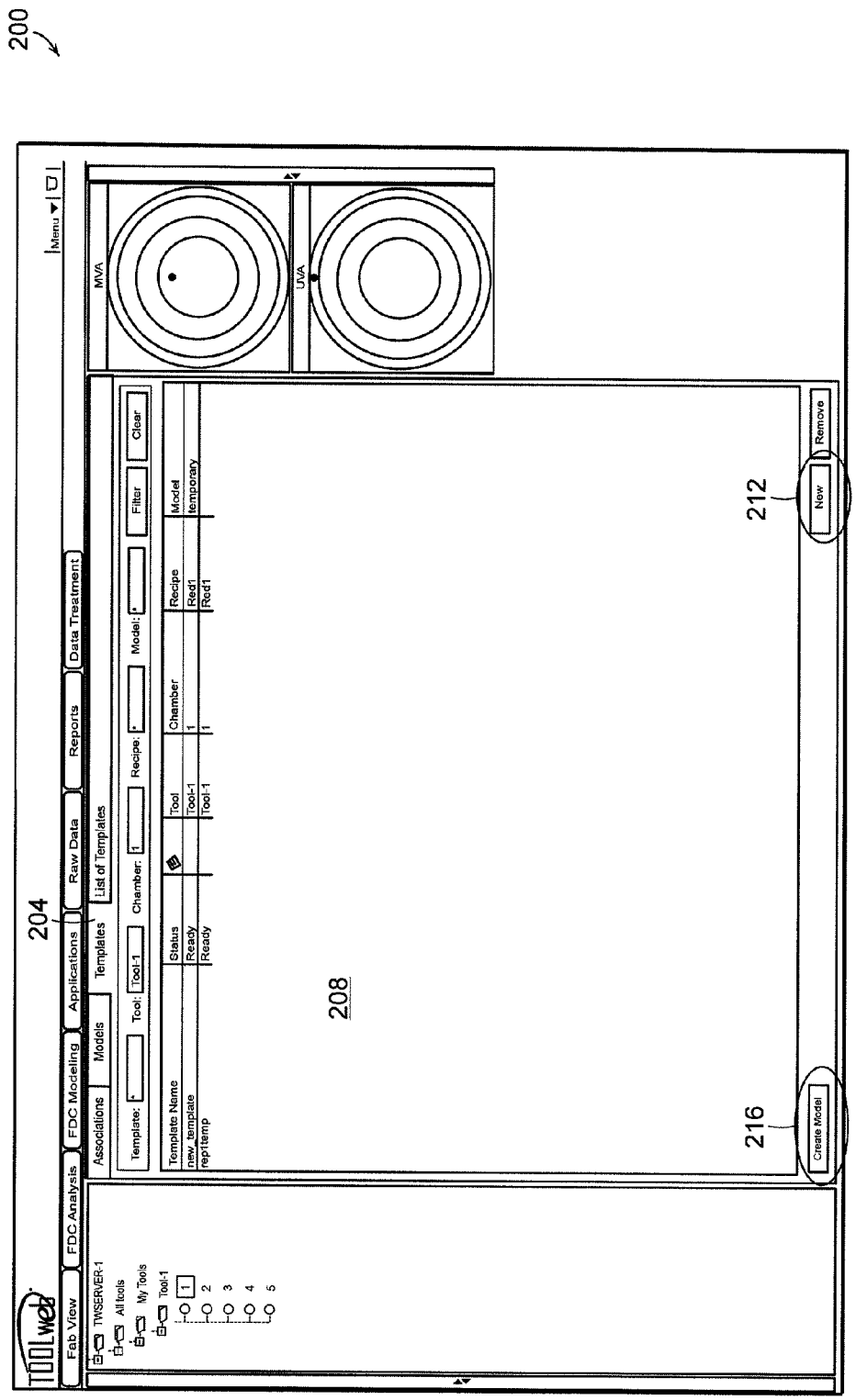
FIGS. 2A-2E are plan views of an exemplary user interface and process for generating a template.

FIGS. 2A-2E are plan views of an exemplary user interface and process for generating a template. FIG. 2A illustrates a user interface 200 that can be used to facilitate implementation of the invention (e.g., as part of the user interface 110 of FIG. 1). In some embodiments, the user interface 200 is a part of a front-end/back-end system. An example of a system that includes a suitable user-interface is the TOOLWEB® application ("TOOLWeb") of MKS Instruments, Inc. of Andover, Mass. that operates in a desktop environment or a server environment. An example of a suitable server environment is the TOOLWebServer® environment of MKS Instruments, Inc. of Andover, Mass.

The user interface 200 is used when a user (not shown) opts to generate a model and a template. The user interface 200 includes a "Templates" tab 204 that includes a window 208 identifying a list of previously-generated templates. As illustrated, two templates are available in the window 208, labeled "new_template" and "rep1temp." The window 208 also displays additional information about the particular templates, for example, "Status" of the template, the "Tool" to which the template applies, the "Chamber" within the "Tool" to which the template applies, and the type of "Model" the template can be used to generate or update. The user interface 200 also includes a "New" button 212 that, upon selection by the user, allows the user to generate a new template (e.g., not identified in the window 208). The user interface 200 also includes a "create model" button 216 that, upon selection by the user, allows the user to generate a new model by activating the model generation or updating process (not shown) or module (e.g., the model modification module 170 of FIG. 1).

Figure 2B:
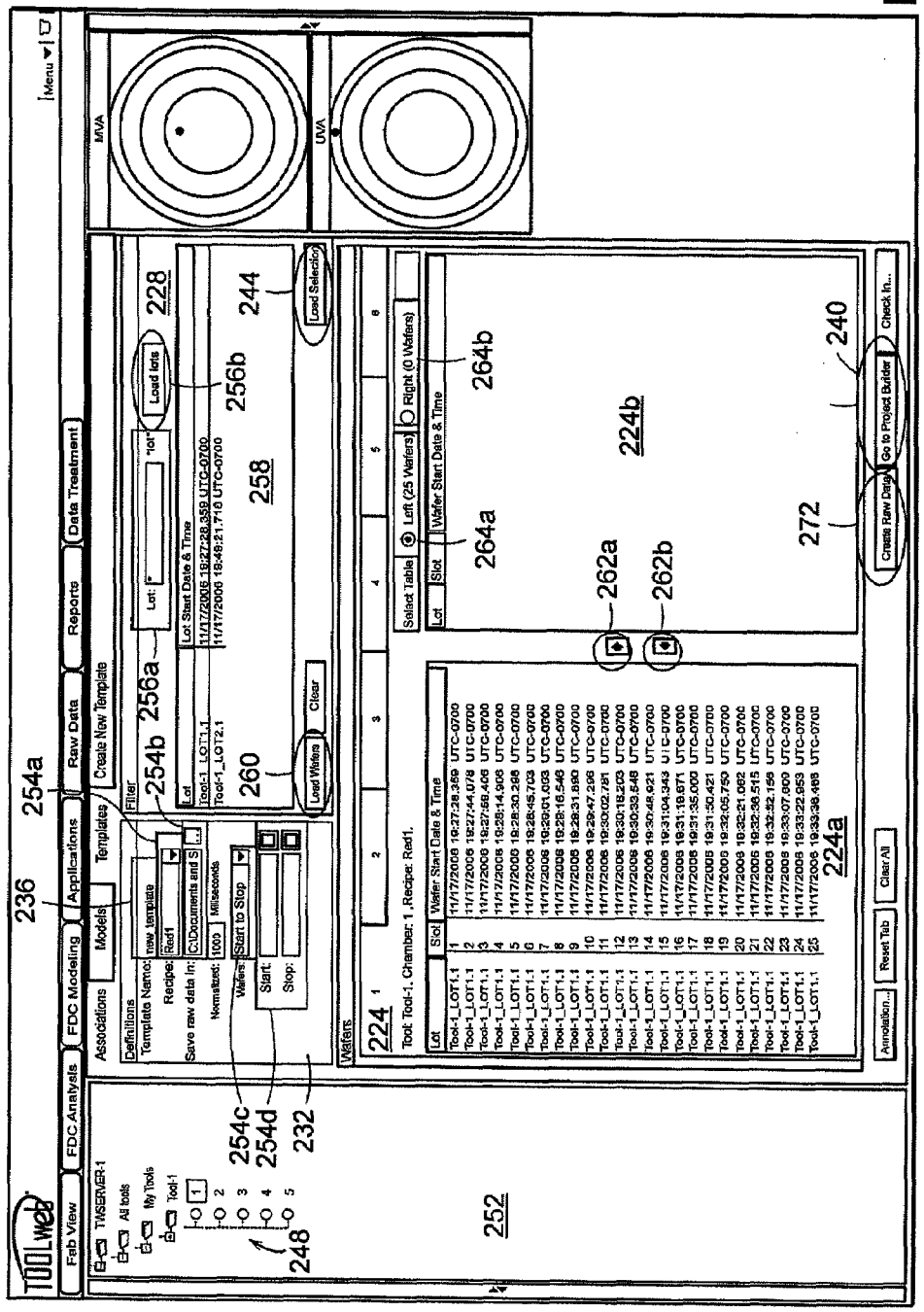

When the user selects the "New" button 212 in the user interface 200 of FIG. 2A, the user interface 220 of FIG. 2B is displayed. The user interface 220 includes a first area 224 labeled "Wafers" that identifies a set of wafers according to one or more fields, for example, "Tool," "Chamber" or "Recipe." The first area 224 also includes information about "Lot," "Slot," and "Wafer Start Date & Time" that further identify individual wafers or steps in a manufacturing process. The user interface 220 also includes a second area 228 labeled "Filter" and a third area 232 labeled "Definitions." The third area 232 includes a text-fillable field 236 labeled "Template Name" that allows the user to specify a name for the particular template being generated. The user interface 220 includes a button 268, labeled "Go to Project Builder" that is active when the user opts to generate a new template. In some embodiments, for example when the user opts to manually generate a model without generating a template, the button 268 is inactive or unavailable for user selection.

In some embodiments, to facilitate generation of a template, the user selects one or more wafers. Information or data about the selected wafers is used to generate the template. The user interface 220 allows the user to select wafers in multiple ways. For example, the user can select the "Load Selection" button 244 to select wafers that are identified in the second area 228. In some embodiments, the user can identify wafers to be used to generate a template using a database query. The user interface 220 allows the user to specify a number of search criteria for searching the database (e.g., the database 140 of FIG. 1). For example, the user can select a "Tool" from the navigation tree 248 in a fourth area 252 of the user interface 220.

The user can also specify search criteria in the third area 232. For example, the third area 232 includes a drop-down menu 254a that identifies particular recipes or sets of processing steps selectable by the user. The user interface 220 also includes a field 254b in which the user can specify a location on the user's system (or a network) where raw data about the wafers can be stored. The user interface 220 allows the user to specify time limitations for the search, either by selecting a start time and stop time from a drop-down menu 254c or by entering the start time and stop time in a fillable field 254d. After the user specified search criteria in the third area 232, the user can further specify search criteria in the second area 228. The second area 228 includes a field 256a labeled "Lot" that allows the user to filter search results by the name of the lot or batch of wafers processed. The user can specify a particular lot name, or the user can select a wildcard that does not filter the search results. After the user specifies a lot-name filter or a wildcard, the user selects the "Load lots" button 256b, which initiates a search or query of the database for wafers that meet the criteria set forth in the third area 232 and the filter in the second area 228. After the user selects the "Load lots" button 256b, the search results populate window 258. The user selects the desired wafers displayed in window 258, and then selects the "Load Wafers" button 260.

The first area includes a first window 224a and a second window 224b. When the user selects the "Load Wafers" button 260, the selected wafers returned by the search populate the first area 224, in particular, in the first window 224a. In some embodiments, the user performs multiple searches with multiple search criteria, and the collective results are displayed in the first area 224. For example, the user can add wafers to the first window 224a by performing a different search with different search criteria upon selecting the "Load Wafers" button 260 in response to the returned search results. The additional results are populated in the window 224a in addition to the results displayed from a previous search. The first and second windows 224-224b identify wafers for selection. The first area 224 includes a button 262a that, upon selection by the user, moves the wafer identification from the first window 224a to the second window 224b and a button 262b that, upon selection by the user, moves a wafer identification from the second window 224b to the first window 224a. The first area 224 also includes a first radio button 264a and a second radio button 264b.

The radio button 264a allows the user to select all of the wafers in the first window 224a for generating a template. Similarly, the radio button 264b allows the user to select all of the wafers in the second window 224b for generating a template. For example, the user can select wafers identified in the first window 224a that are not to be included in the template, and can select the button 262a to move those wafers to the second window 224b. The user then selects the first radio button 264a to indicate that the wafers in the first window 224a are to be used for generating the template. After the user has selected the desired wafers, the user selects the "Go to Project Builder" button 268, and the user interface 270 of FIG. 2C is displayed.

In embodiments in which the user opts to generate only a model and not a template, the user selects the "Create Raw Data" button 272, and a model is generated based on the data associated with the selected wafers. As illustrated, the "Create Raw Data" button 272 is not active since the user interface 220 reflects the user opting to generate a model and a template, rather than a model only.

In some embodiments, the template-generation process is the "Project Builder" process of commercially available software application, for example, the SIMCA-P utility offered in software applications, such as SIMCA® P+ or SIMCA® QP+ sold by Umetrics, Inc. of Umea, Sweden. Templates can be generated in other ways, for example manually. The "Project Builder" process is a dedicated tool for generation of models and templates for one or more Umetrics products.

Figure 2C:
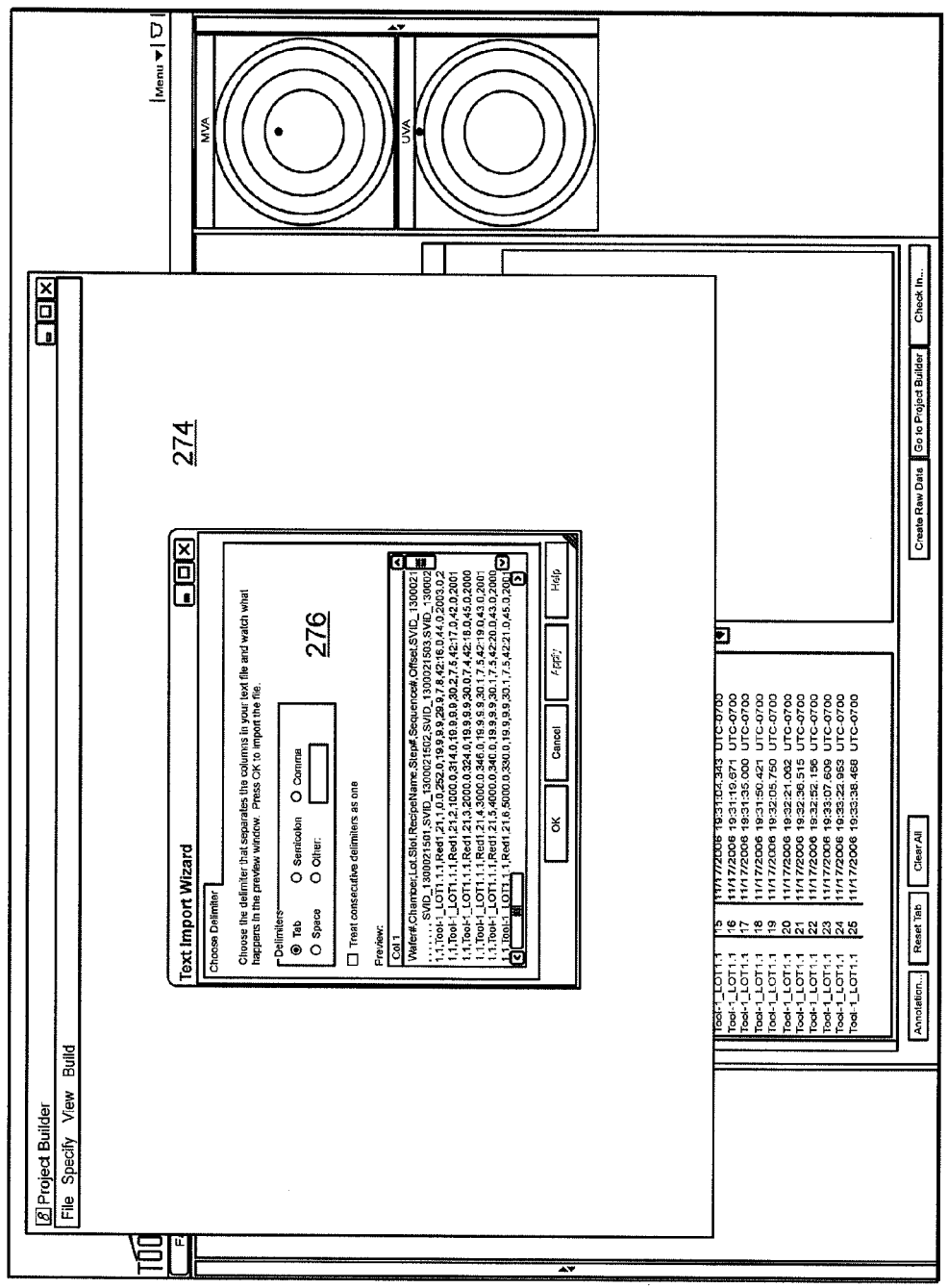

FIG. 2C illustrates the user interface 270 after the template-generation process has been initiated. The "Project Builder" window 274 is opened. The user is prompted by the "Text Import Wizard" window 276. The "Text Import Wizard" window 276 allows the user to specify the arrangement of data in the template based on the data associated with the wafers in the first area (e.g., either the first window 224a or the second window 224b, depending on the particular radio button 264a-264b selected when the user selects the "Go to Project Builder" button 268). Examples of the type of wafer data include variable identification (VID) selection, VID calculations, an identification of the particular wafer or integrated circuit, measurement (e.g., metrology) of the wafers, or other parameters associated with the wafers. The "Text Import Wizard" window 276 provides a summary of the data that will be used to generate the template. In some embodiments, the template is saved as a data file within the system 100 of FIG. 1.

Figure 2D:
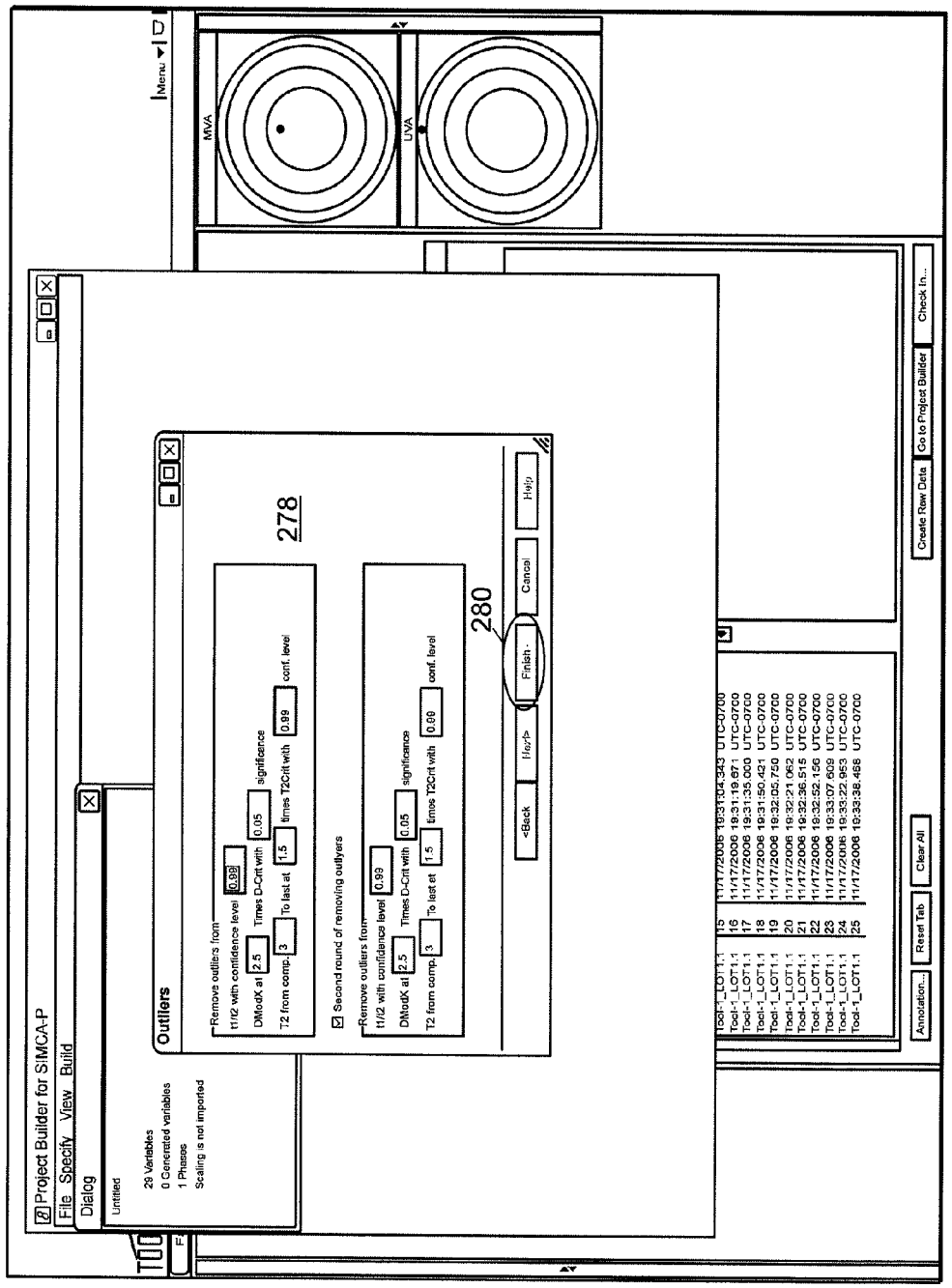

FIG. 2D illustrates the user interface 220 with an "Outliers" window 278 that allows a user to exclude particular data points (e.g., wafers or steps) from the template, for example, when the values of those data points fall outside of an acceptable range or tolerance at a particular confidence level. In some embodiments, the "Outliers" window 278 allows the user to simulate the manual process of excluding wafers from a model. If particular wafer data points exceed the threshold value at the particular confidence level, these data points and/or wafers are not included in subsequently generated models that are based on the template.

The multivariate analysis module can perform, for example, a Hotelling-type calculation or a DModX-type calculation on the wafer data to determine if a particular point or a particular wafer is an outlier. A Hotelling-type calculation can be used to determine a $T^2$ score. A $T^2$ score can be calculated according to the following equation:

$$T^2 = \left(\frac{\bar{x} - \mu_0}{\sigma}\right)^T S^{-1} \left(\frac{\bar{x} - \mu_0}{\sigma}\right),\quad\text{Equation 1}$$

where:
σ=standard deviation for a particular variable, based on data acquired for previous wafers, $$\bar{x} = \begin{bmatrix} \bar{x}_1 \\ \bar{x}_2 \\ \vdots \\ \bar{x}_p \end{bmatrix},$$

measured value of parameters, for p variables, $$\mu_0 = \begin{bmatrix} \mu_1^0 \\ \mu_2^0 \\ \vdots \\ \mu_p^0 \end{bmatrix},$$

mean value of parameters based on previous wafers, for p variables
$S^{-1}$=an inverse correlation matrix, which is the inverse of the covariance matrix, S, illustrated below:

$$S = \begin{bmatrix} \bar{S}_1^2 & \bar{S}_{12} & \bar{S}_{13} & \cdots & \bar{S}_{1p} \\ & \bar{S}_2^2 & \bar{S}_{23} & \cdots & \bar{S}_{2p} \\ & & \bar{S}_3^2 & \cdots & \bar{S}_{3p} \\ & & & \ddots & \vdots \\ & & & & \bar{S}_p^2 \end{bmatrix}$$

where:

$$S_{ij} = \frac{1}{N-1} \sum_{i=1}^{k} \sum_{j=1}^{n_i} (x_{ij} - \bar{x})(x_{ij} - \bar{x})^T,$$

where indices i and j identify the matrix element or both S and x in a generalized k×n matrix.

In general, a $T^2$ score is a calculation of the weighted distance of manufacturing process variables for an output (e.g., the wafer 120') of the manufacturing process relative to an output produced under normal process operation. One way to understand the meaning of the $T^2$ value is to consider it in terms of a geometric description. A normal manufacturing process is a cluster of data points in an n-dimensional space, where n is the number of measured manufacturing process variables. $T^2$ is the squared distance of a new output from the center of this cluster of data points weighted relative to the variation output of the in the normal process condition. The variation is often illustrated as an n-dimensional hyper-ellipse that bounds the cluster of data points. In general, Hotelling-type calculations can be used to, for example, determine whether a particular point is an outlier (e.g., outside the hyper-ellipse) with respect to the remainder of the data set. More specifically, a Hotelling-type calculation can be used to determine whether a particular measured parameter is outside an alarm limit, as determined by a mathematical model for the process parameters being observed. When a calculated $T^2$ score exceeds a threshold $T^2$ score, the particular data point or wafer can be excluded from the generated template.

Another example of a suitable mathematical calculation is a DModX-type calculation. A DModX-type calculation involves calculating the distance of a particular data point from a location in an n-dimensional space that represents a preferred location (e.g., a location associated with an ideal wafer). The DModX value is calculated using a principal component analysis that maps the n-dimensional variable to a lower order (e.g., less than order n) dimensional variable. Mathematically, the DModX value is the orthogonal component (or residue) resulting from the principal component analysis. A DModX value can be indicative of a range of values (e.g., a "tolerance volume") about a particular variable (e.g., a data point) in the mathematical model. Similarly to the Hotelling-type calculation, when the calculated DModX score exceeds a threshold DModX score, the particular data point or wafer can be excluded from the generated template. As shown in the "Outliers" window 278, the values for the $T^2$ score and the DModX score can be configured by the user via the window 278, in addition to the confidence level and various multiplication factors.

Figure 2E:
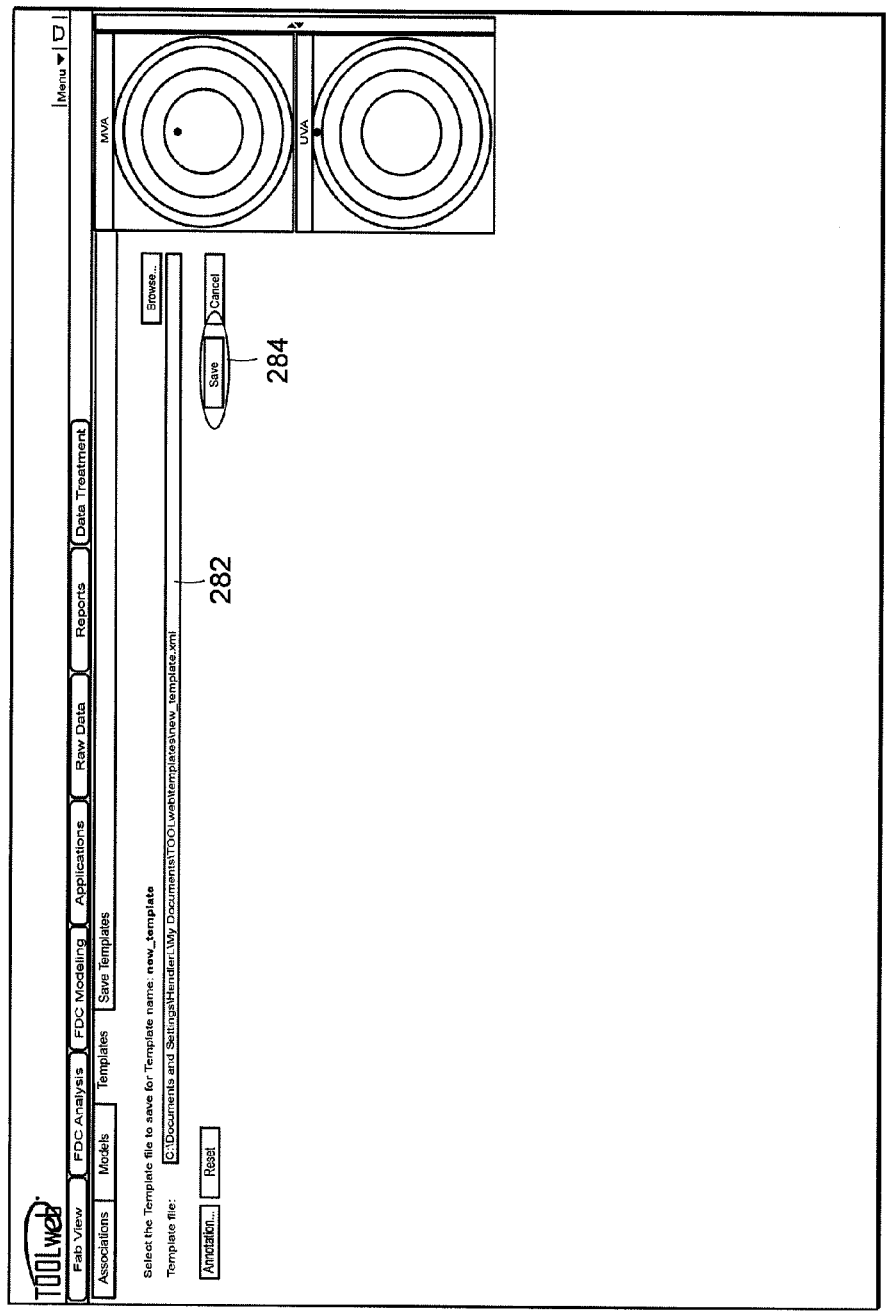

After the user has specified the particular values in the "Outliers" window 278, the user can select a "Finish" button 280, which completes the template-generation process. FIG. 2E illustrates the user interface 220 after completion of the template-generation process. The generated template can be saved to a memory (e.g., the database 140 or a different memory of the processor 105) within the system 100 of FIG. 1. The "template file" field 282 allows the user to specify the location on the user's particular system at which the template will be saved upon user selection of the "Save" button 284. The generated template is then available for subsequent use to generate or update models.

Figure 3A:
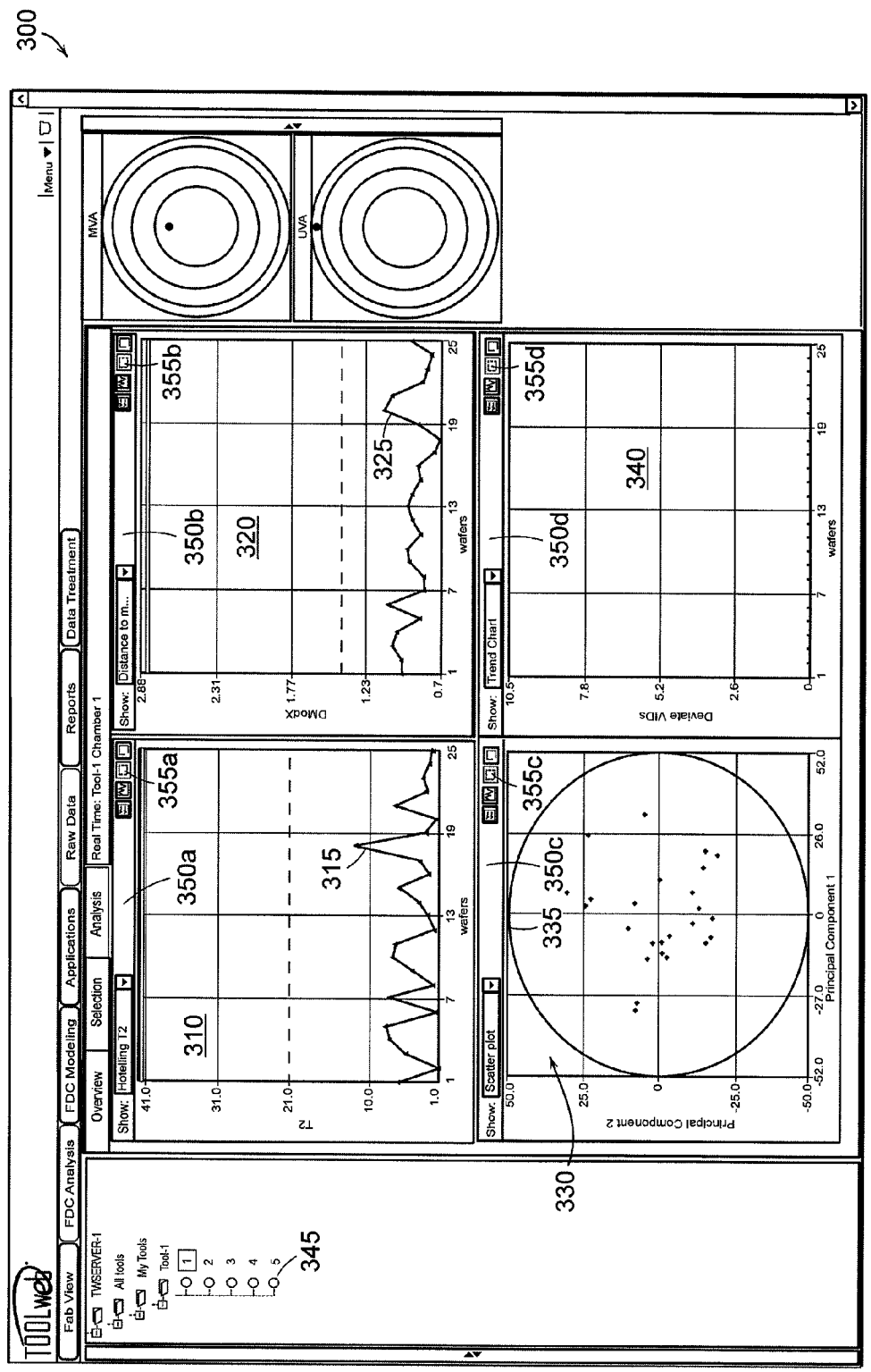
FIGS. 3A-3C are plan views of an exemplary user interface and process for selecting wafers having parameters to be used to generate a template or model.
Figure 3B:
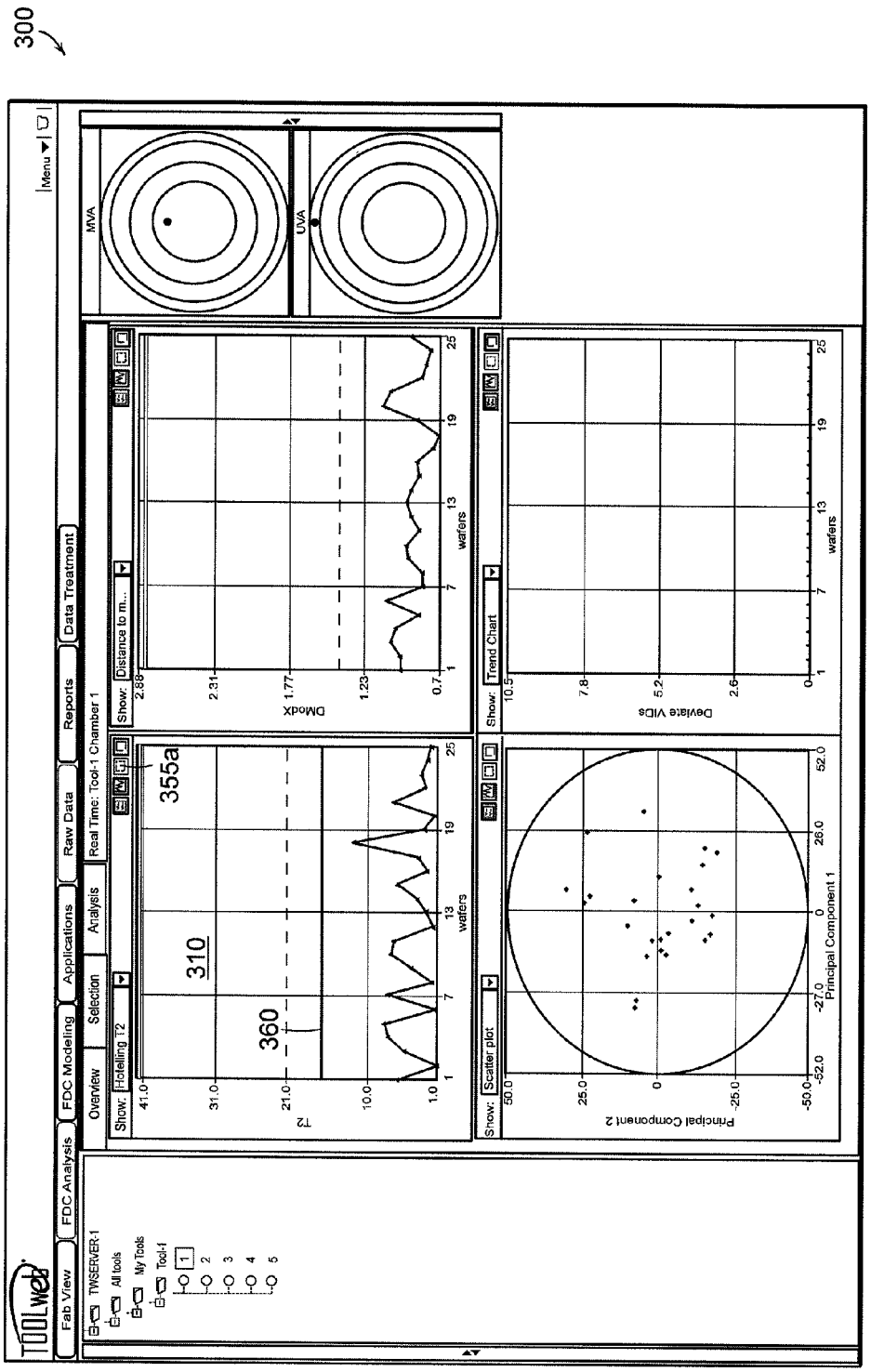
Figure 3C:
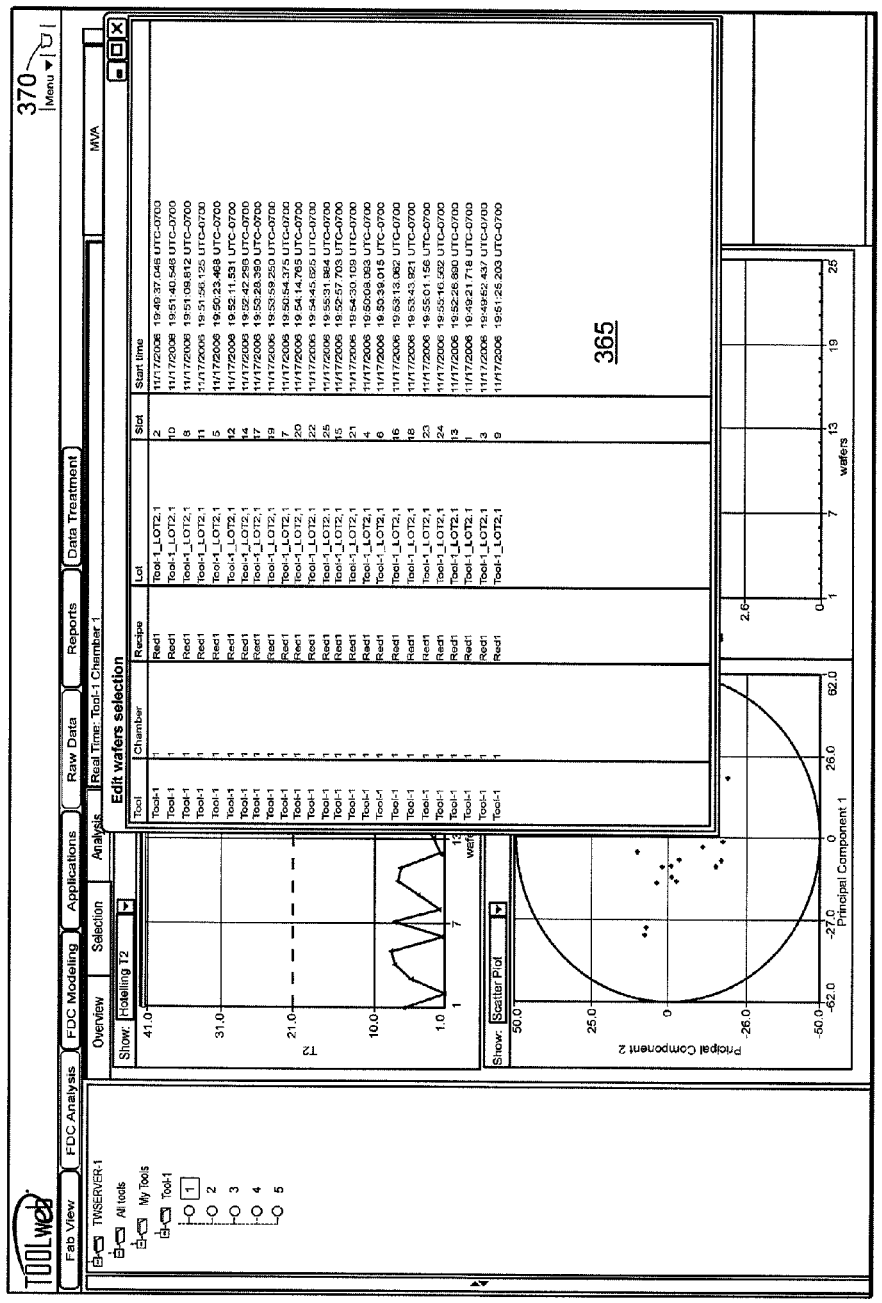

FIGS. 3A-3C are plan views of an exemplary user interface and process for selecting wafers having parameters to be used to generate a template or model. FIG. 3A shows a screen 300 used for real-time monitoring of data associated with a manufacturing process. The screen 300 can be accessed from the Fault Detection and Classification ("FDC") tab 305 in the TOOLWeb user interface. As data is acquired during the manufacturing process (e.g., by the data acquisition module 130 of FIG. 1), the data can be processed and displayed to a user (e.g., via the user interface 110 of FIG. 1). The data is analyzed and displayed in various forms in the screen 300. The screen 300 shows a first area 310 illustrating a Hotelling-type graph plotting $T^2$ values along the vertical axis and wafer number along the horizontal axis. The $T^2$ value corresponding to approximately 21 represents a threshold value of $T^2$ for the wafers being processed and is illustrated as a horizontal line in the first area 310. The $T^2$ threshold can be determined by a user. The $T^2$ value of 21 is illustrative and exemplary, and other values of the $T^2$ value can be used based on the specific parameters of the manufacturing process and user selection. A Hotelling-type calculation on data associated with the wafers being processed does not result in a $T^2$ value or score that exceeds 21 for any of the wafers. This is illustrated by the connected data points 315 in the first area 310.

The screen 300 also shows a second area 320 illustrating a DModX-type graph plotting DModX values along the vertical axis and wafer number along the horizontal axis. The horizontal axis of the second area 320 corresponds to the horizontal axis of the first area 310 (e.g., both axes refer to the same wafers). The DModX score corresponding to approximately 1.30 represents the threshold value of DModX for the wafers being processed and is illustrated as a horizontal line in the second area 320. The DModX threshold can be determined by a user. The DModX value of 1.30 is illustrative and exemplary, and other values of the DModX value can be used based on the specific parameters of the manufacturing process and user selection. A DModX-type calculation performed on data associated with the wafers being processed does not result in a DModX value or score that exceeds approximately 1.30 for any of the wafers. This is illustrated by the connected data points 325 in the second area 320.

The screen 300 also shows a third area 330 illustrating a principal component analysis scatter plot graph plotting Principal Component 2 values along the vertical axis and Principal Component 1 values along the horizontal axis. The ellipse 335 in the third area 330 represents a bound on wafers having desirable properties. All of the data points in the scatter plot graph fall within the ellipse 335 because the Principal Component 1 values and the Principal Component 2 values fall within normal confidence boundaries defined by a multivariate analysis model for each Principal Component.

The screen 300 also illustrates a fourth area 340 that includes a trend chart graph plotting along the vertical axis the number of variables ("SVIDs" or "VIDs") that deviate from a univariate ("UVA") model and/or that generate a UVA alert. The fourth area 340 plots the wafer number along the horizontal axis. The horizontal axis of the fourth area 340 corresponds to the horizontal axis of the first area 310 and second area 320. VID generally refers to a "variable identification." SVID generally refers to a "system variable identification." None of the wafers along the horizontal axis of the fourth area 340 are showing UVA alerts (e.g., represented as vertical spikes in the fourth area 340), in part because a UVA model is not active.

The screen 300 also includes a navigation bar 345 that allows a user to view the data for wafers processed in other tools and/or chambers in the manufacturing facility by selecting different chamber from "Tool-1." For example, when a user selects "2," a screen similar to screen 300 is displayed with areas similar to the first 310, second 320, third 330, and fourth areas 340 but corresponding to the wafers being processed in chamber named "2." Each area 310, 320, 330, and 340 includes a toolbar 350a-350d that includes, among other things, a button 355a-355d that activates a wafer selection tool.

FIG. 3B illustrates the screen 300 with the button 355a in the first area 310 selected to activate the wafer selection tool. The user can use the wafer selection tool to select wafers having desirable properties based on the data displayed in the first 310, second 320, third 330, and fourth areas 340 of FIG. 3A. The user can select a subset of wafers having desirable properties by drawing a box 360 around the data points in the first area corresponding to wafers having desirable properties. The selected subset of wafers can be used to populate the wafer basket (discussed further below). The first area 205 of the screen 200 of FIG. 2A allows a user to select desirable wafers. Wafers can be deemed desirable based on the user's or operator's discretion. For example, wafers can be deemed desirable based on textual representation of the data about the wafers. Similarly, the wafer selection tool allows a user to select desirable wafers based on the graphical representation of data about the wafers. The wafers can be considered desirable to an operator because none of the data associated with the wafers resulted in a $T^2$ score over the threshold value. In some embodiments, a wafer is considered desirable if data associated with the wafer results in any of a $T^2$ score below the $T^2$ threshold, a DModX score below the DModX threshold, a plot within the ellipse 335 of the principal component analysis scatter plot, the wafer does not generate a Deviate VID, or any combination of these.

FIG. 3C illustrates the screen 300 after the user has selected wafers of interest (e.g., wafers having desirable properties). The wafers in the first area 310 are selected (and data points associated therewith are highlighted) with the wafer selection tool. The wafer data points in the second area 320 (not shown) third area 330 and the fourth area 340 corresponding the same wafers are also highlighted. This is because the graphs in the first 310, second 320, third 330 and fourth areas 340 represent different statistical representations of data from the same wafers. Similarly, using the wafer selection tool in the second area 320 to select wafers having desirable properties results in the data points in the first 310, third 330, and fourth areas 340 corresponding to the same wafers also being highlighted, and so on for each of the areas of the screen 300.

After the wafers have been selected, the user can open a data window 365 by activating a "basket view" icon 370. The data shown in the data window 365 is similar to the first area 224 of the user interface 220 in FIG. 2B. In some embodiments, the wafer list in the first area 224 can be populated from the basket upon a user clicking the "Load Wafers" button 260. By using the basket in this fashion, the data associated with the wafers selected from the screen 300 is available for analysis and processing, for example, generating a template or a model.

Figure 4A:
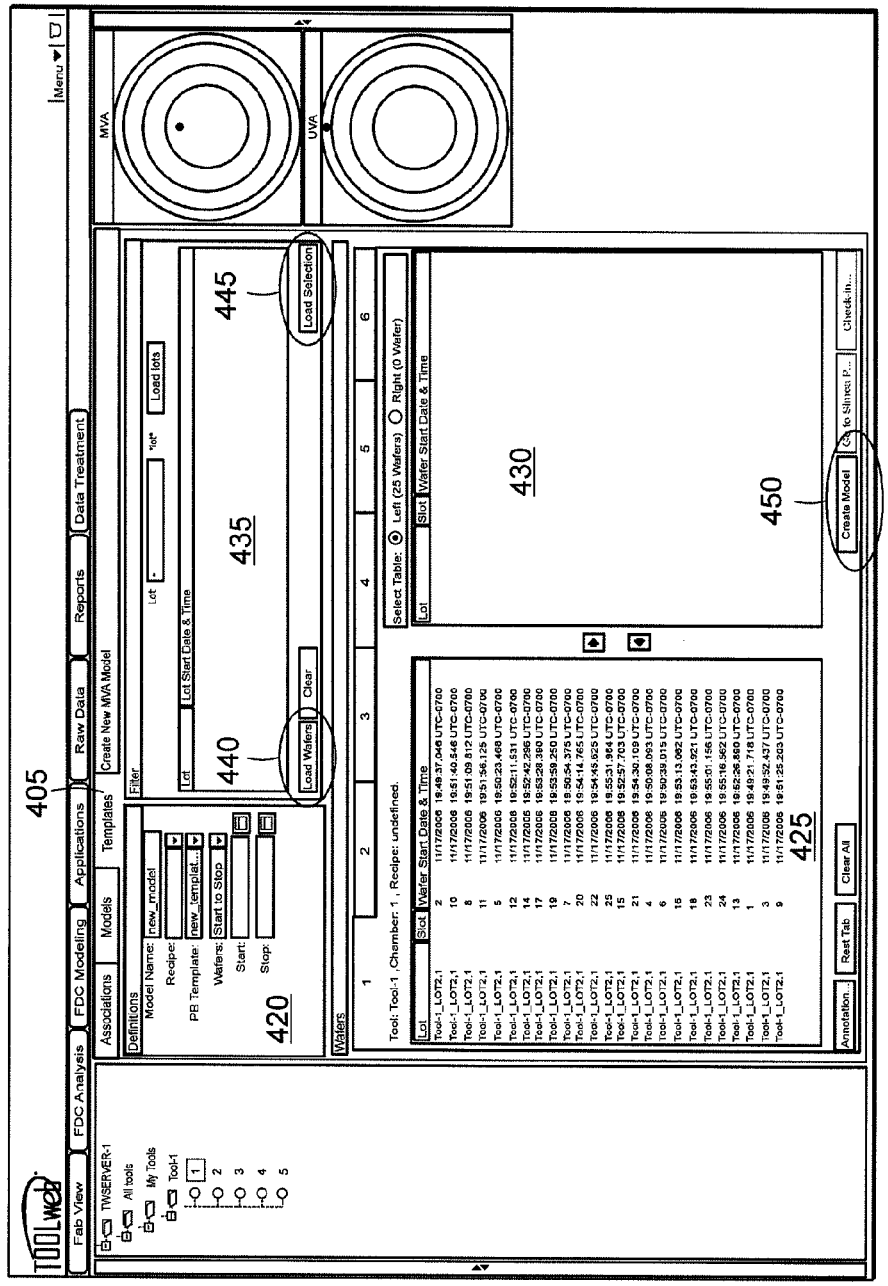
FIGS. 4A-4C are plan views of an exemplary user interface and process that initiates creating or updating a model based on a template.
Figure 4B:
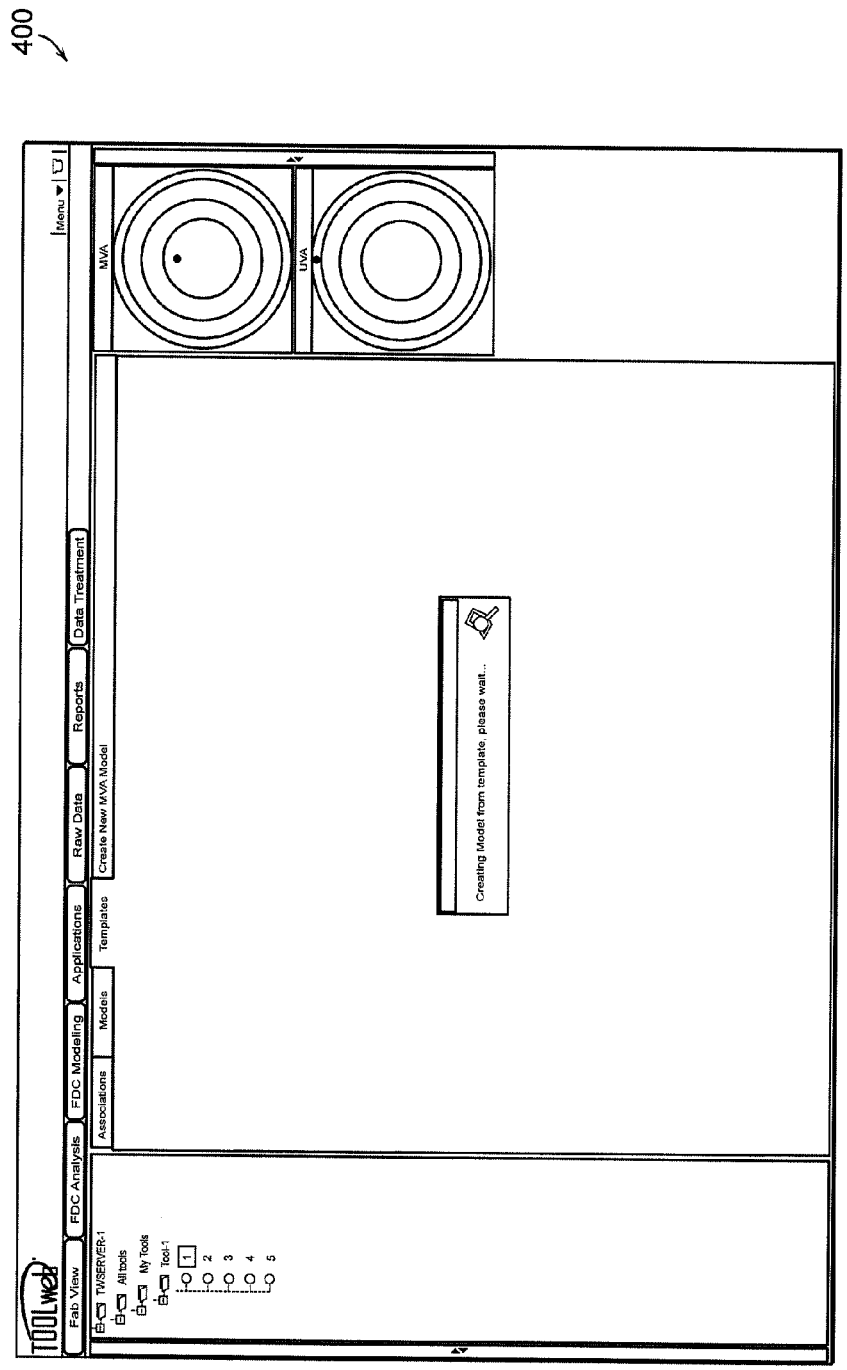
Figure 4C:
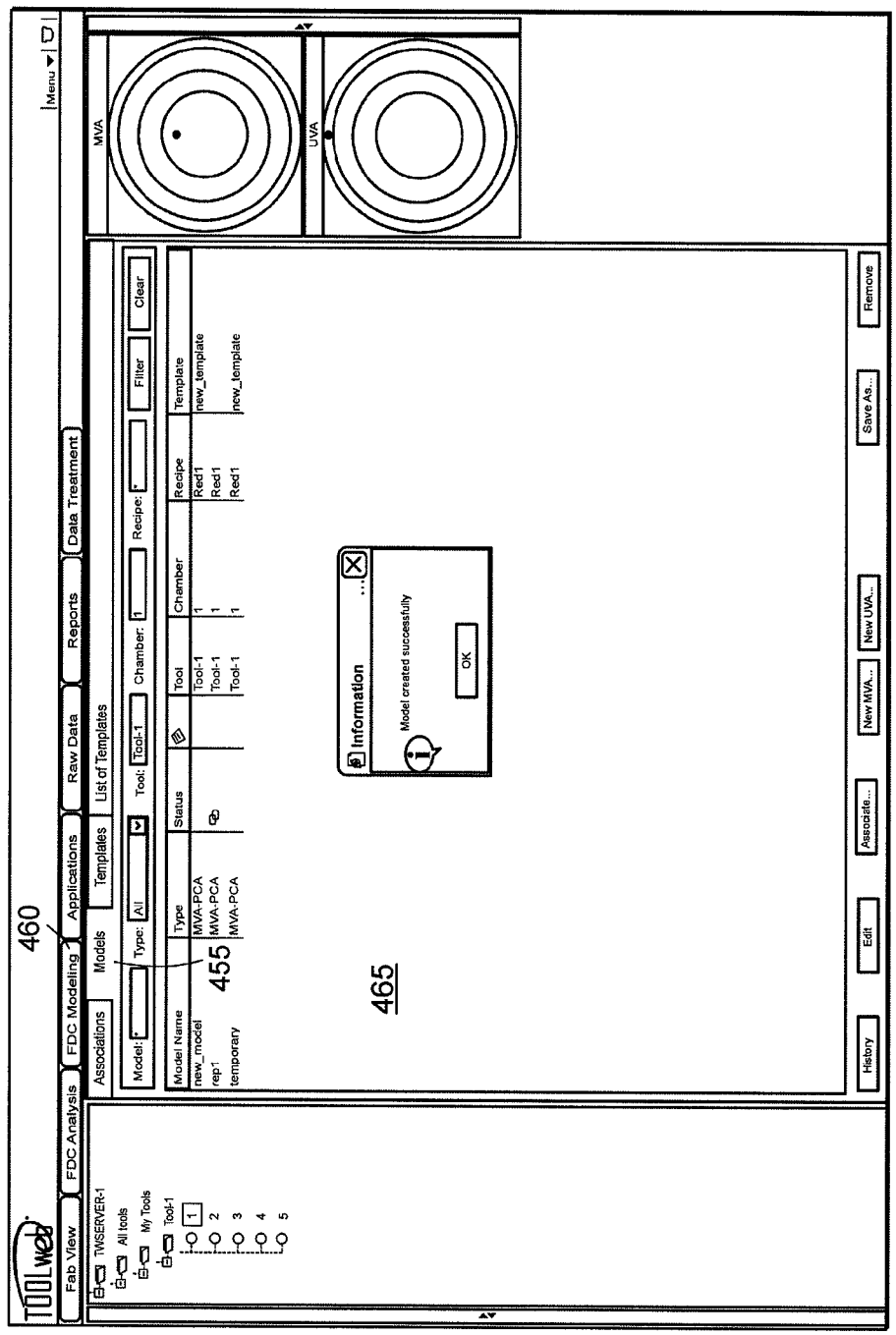

FIGS. 4A-4C are plan views of an exemplary user interface and process that initiates creating or updating a model based on a template. FIG. 4A depicts a screen 400 in the TOOLWeb user interface for generating or updating a model. The screen 400 includes a "Templates" tab 405. The tab 405 includes a first area 420 that includes several user-definable fields for determining or defining aspects of the model to be generated or updated. As depicted, the tab 405 is configured for generation of a new model based on the template named "new_template.". The user has chosen "new_model" as the name for the model to be generated.

The tab 405 also includes a second area 425 that identifies a set of wafers. A user can select a subset of wafers from the second area 425 to populate the third area 430. The tab 405 also includes a fourth area 435. The fourth area 435 identifies one or more "lots" or batches of wafers that are processed according to the user-definable fields in the first area 420. Each lot or batch can contain data about one or more processed wafers. The user can select one or more lots in the fourth area 435 and can populate the second area 425 upon selecting the "Load Wafers" button 440. The second area 425 can also be populated with wafers from the wafer basket as discussed above with respect to FIGS. 3A-3C by selecting the "Load Selection" button 445 in the fourth area 435. The template identified in the first area 420 and data associated with the wafers in the fourth area 435 are used by the model generation process to define the new model. After the user has selected the template and wafers for generating the model, the user can activate and finalize the model generation process by selecting the "Create Model" button 450 in the tab 405. The user is notified that a model is being generated from the template as depicted in the screen 400 shown in FIG. 4B.

FIG. 4C illustrates the screen 400 after the model has been created successfully. Upon completion of the model, the model generation process selects the "Models" tab 455 in the "FDC Modeling" tab 460 and presents a window 465 containing a list of available models. The newly-generated "new_model" has been saved and is listed among the models. Additional information about the models are presented in the window 465, such as "Type," "Status," "Tool," "Chamber," "Recipe," and "Template."

"Type" generally refers to the mathematical or statistical algorithm represented by the model. For example, for "new_model," the "Type" is "MVA-PCA" which refers to a multivariate analysis-principal component analysis-type algorithm. "Tool" generally refers to the particular tool in the processing facility (e.g., the processing facility 115 of FIG. 1), from which data used to build the new model was acquired. Similarly, "Chamber" generally refers to the portion of the "Tool" in the processing facility from which data was acquired and "Recipe" generally refers to the specific type, series and sequence of process steps used in the processing facility from which data was acquired to generate the model. "Template" generally refers to the template that was used to generate the model.

FIGS. 5A-5G are plan views of an exemplary user interface and process facilitating user configuration of one or more conditions. In some embodiments, conditions represent a set of rules that trigger a consequence. Conditions can be associated with or linked to a particular model acting on a particular process tool, process chamber, or series of processing steps (e.g., a recipe). Conditions can be based on data flow into or within a manufacturing system (e.g., the system 100 of FIG. 1). In some embodiments, conditions are based on data associated with a particular SVID or context of a particular wafer (e.g., lot name, product, wafer identification, or other information that identifies a wafer). In some embodiments, consequences of a condition being met are defined as part of the condition. By way of example only, types of consequence can include changing or updating an alarm limit for a model, building a new model, triggering an alarm, or identifying and/or classifying a fault in the system.

Figure 5A:
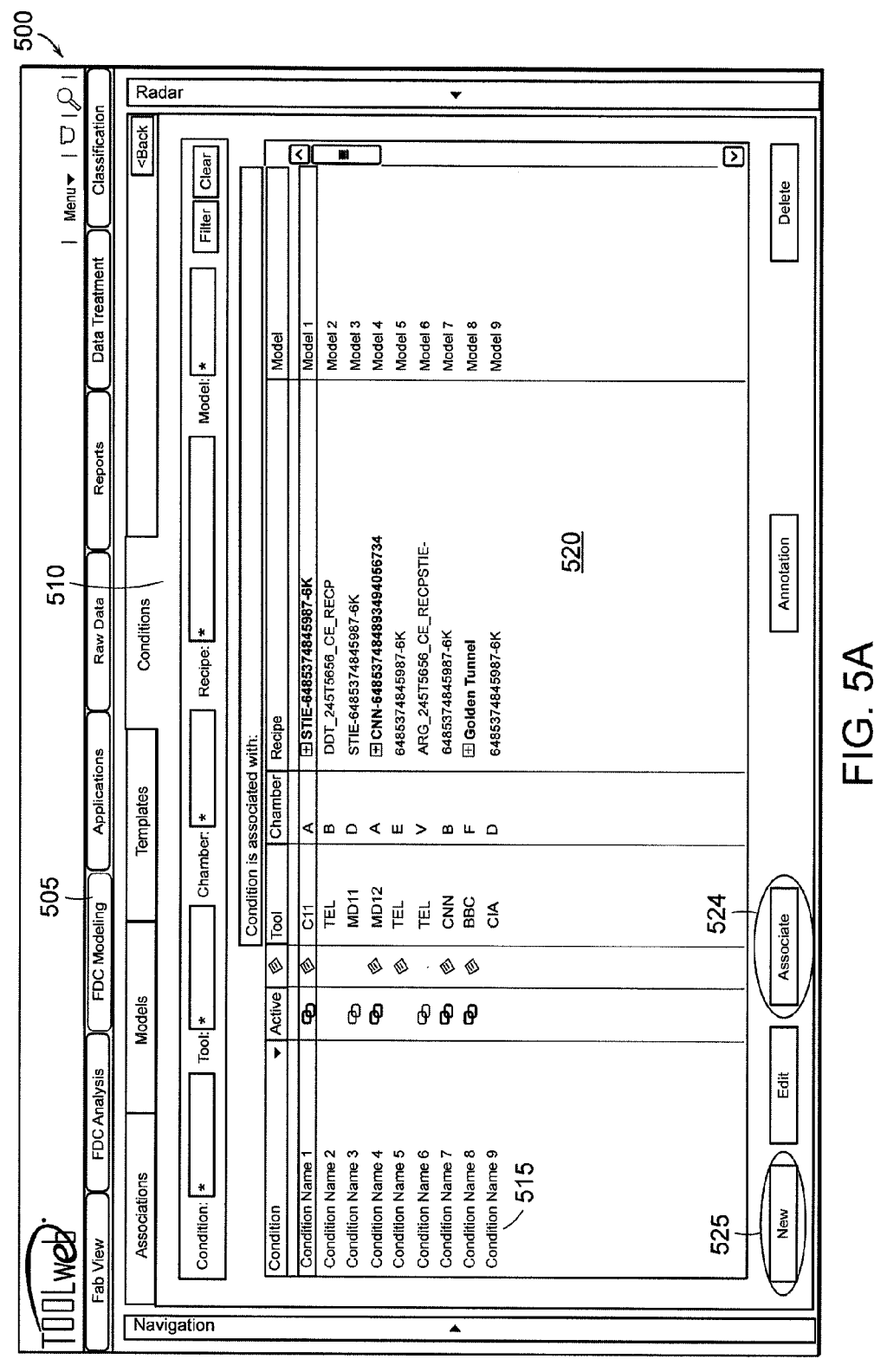

FIG. 5A illustrates a screen 500 in the "FDC Modeling" tab 505 of the ToolWebServer software application. The "Conditions" tab 510 is displayed and includes a list 515 of conditions. Each of the conditions in the list 515 is associated with data in fields relating to a "Tool," "Chamber," "Recipe," and "Model" in the "Condition is associated with:" window 520. A user can select an existing condition from the list 515, and upon selection of the "Associate" button 524, associate the selected condition with a model (e.g., via an association window (not shown)). In some embodiments, the condition is linked to an existing model that specifies parameters for a particular process tool, process chamber, or series of processing steps or recipe. The condition can also be associated with all of the models that relate to a particular process tool or process chamber. After the condition is associated with the model, acquired data is analyzed and compared to the model. When the condition associated with the model is satisfied, the consequence of the particular condition is implemented. An existing condition can be, for example, triggered after periodic maintenance of a process tool or chamber.

Additional examples of existing conditions include conditions that specify data from the first lot or batch of wafers processed after a periodic or preventive maintenance operation is not used and data from the next two subsequent lots or batches of wafers is used with different (e.g., higher) threshold for alarm limits. In this way, parameter values can be controlled during the duration of time between when an update to the model is scheduled and when the update process can be initiated. For example, data can be collected during this duration, and the data can be incorporated into the new or updated model, for example, by generating an intermediate model that will subsequently be updated or by incorporating the data into an existing model based on different threshold values for the data. In some embodiments, data from the two subsequent batches of wafers can be used to create a new model and update the new model (e.g., an intermediate model) or to update an existing model (e.g., a previously-saved model or the intermediate model) by associating the conditions with the existing model during acquisition of wafer data subject to possibly different threshold conditions. Conditions can be used to control how data is acquired during wafer processing and how acquired data is used by the processing system.

In some embodiments, a user can generate or create a new condition. For example, a wafer can be processed as a calibration wafer to determine appropriate values for the process tool, chamber, or recipe or to determine whether the process tool, chamber, or recipe fall within acceptable limits. A user can specify a new condition by selecting the "New" button 525 in the "FDC Modeling" tab 505. After the user selects the "New" button 525, the screen 500 of FIG. 5B is displayed.

Figure 5B:
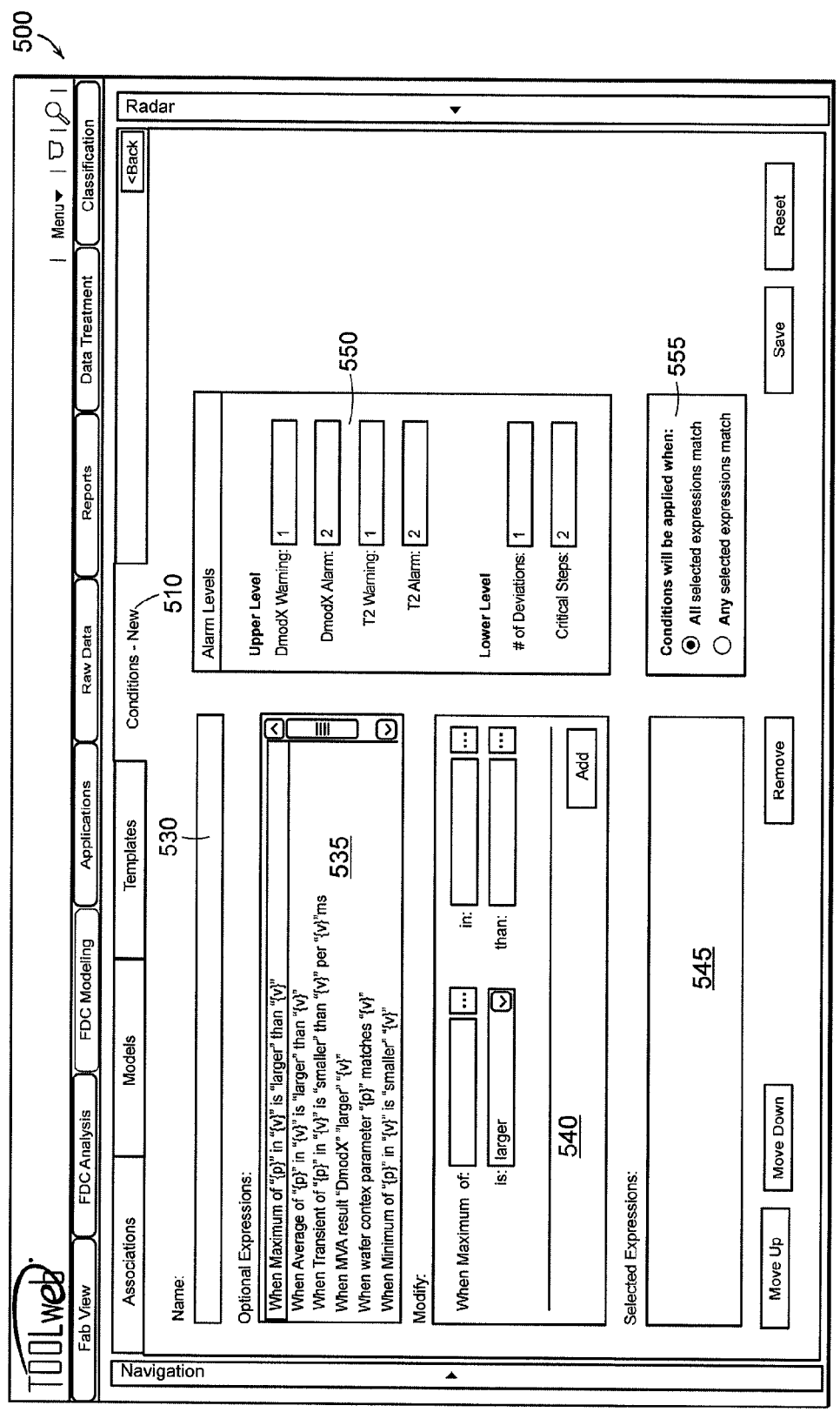
Figure 5C:
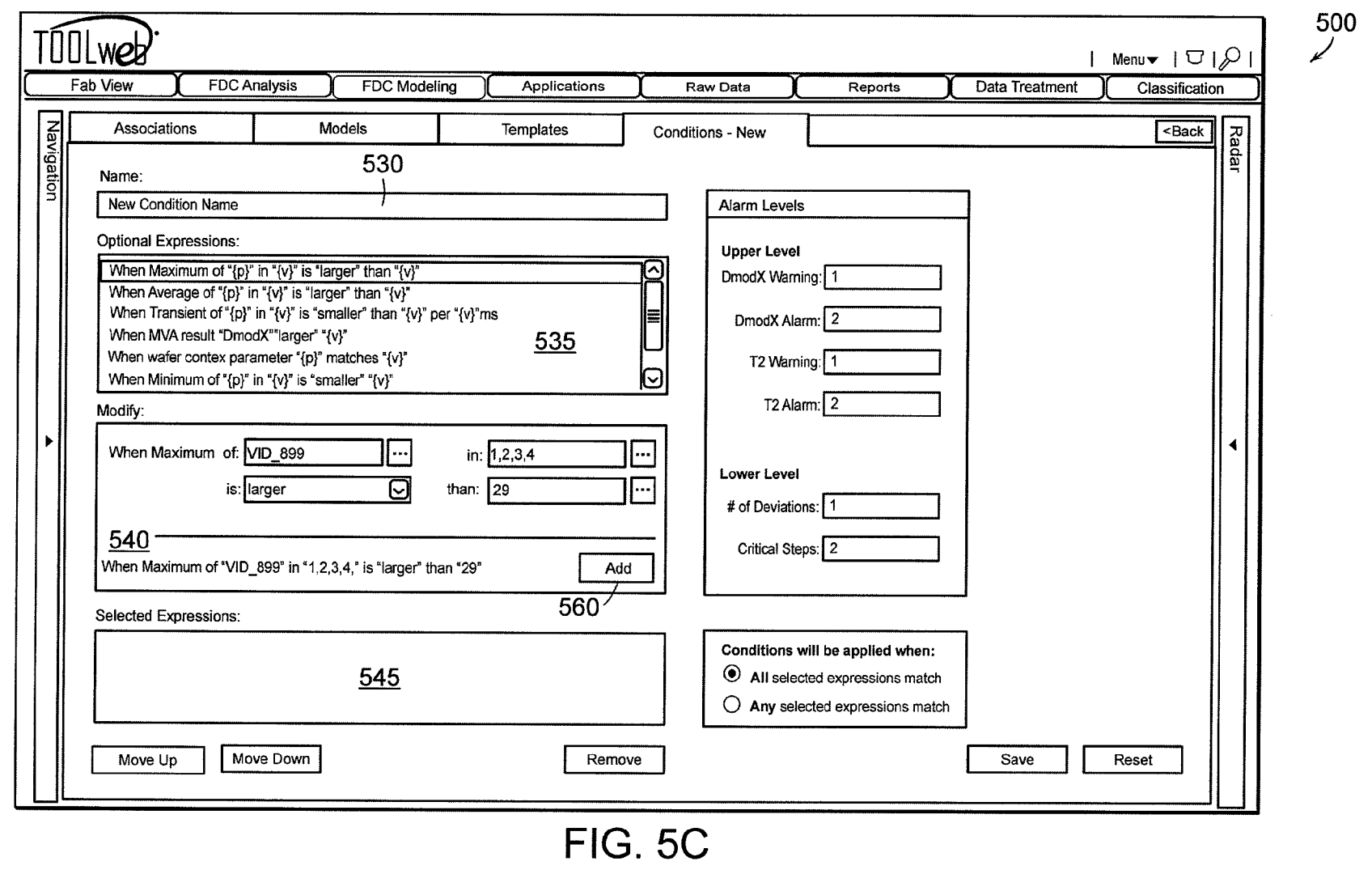
Figure 5D:
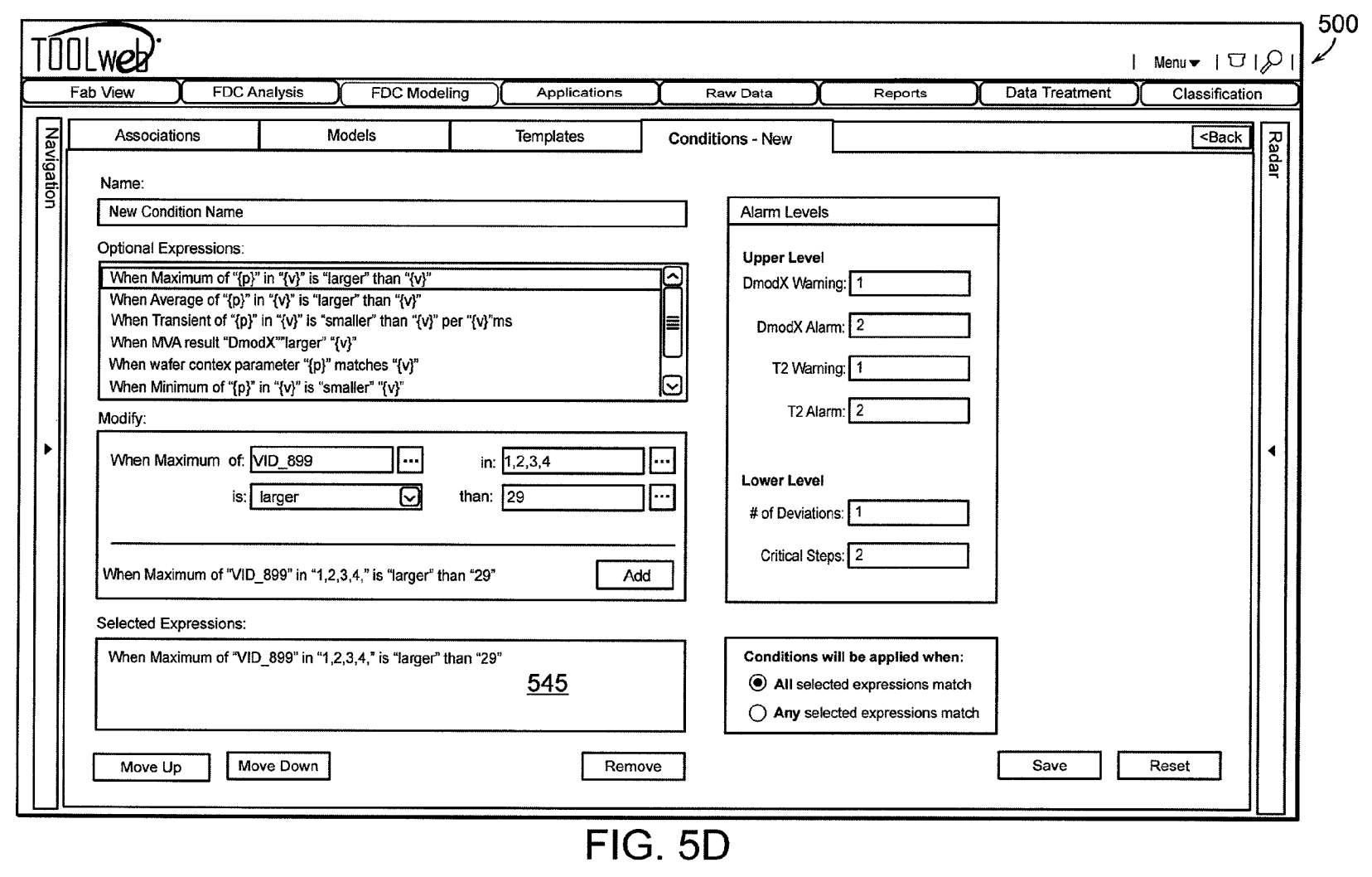
Figure 5E:
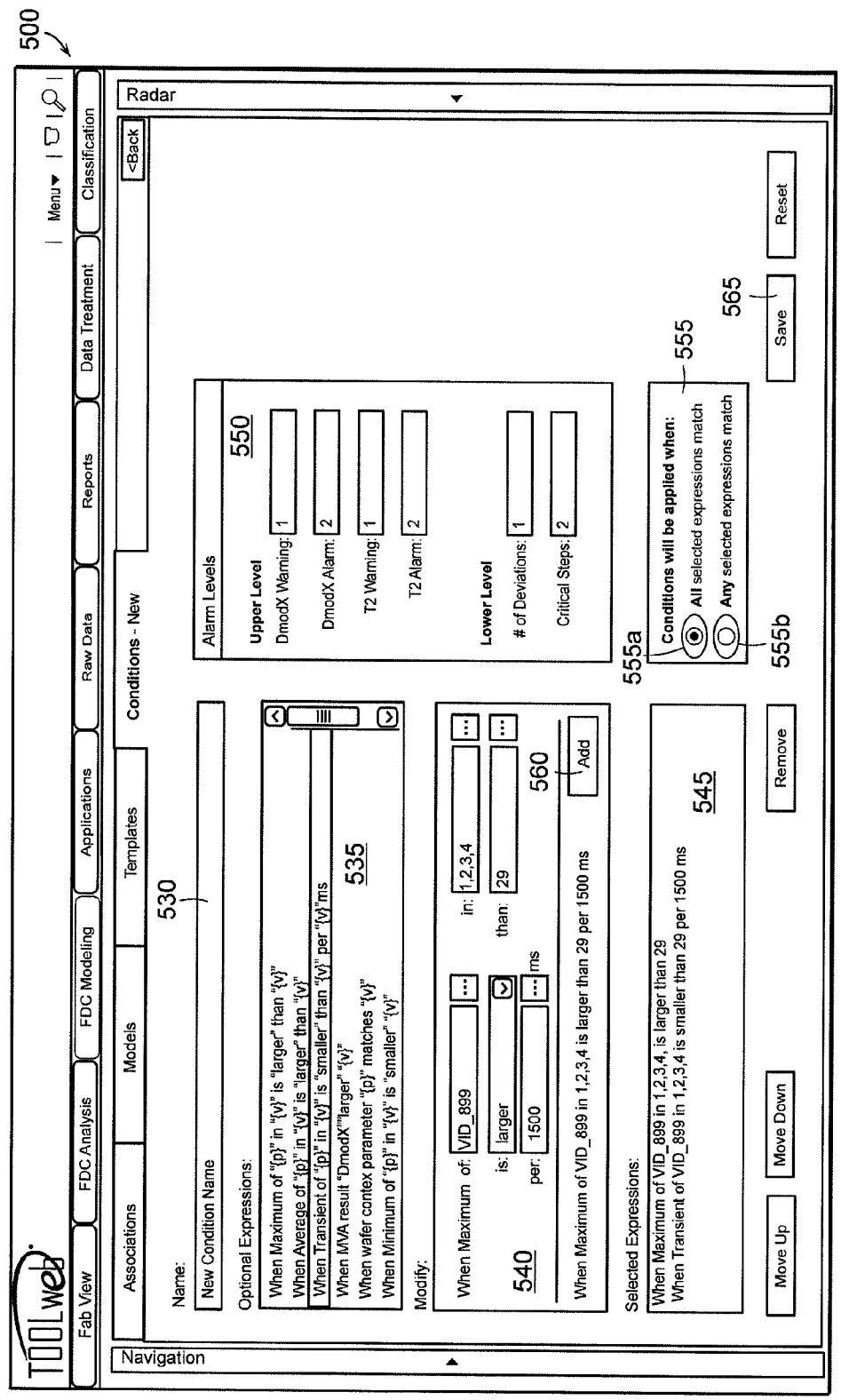

The screen 500 of FIG. 5B shows a "Name" field 530, an "Optional Expressions" area 535, a "Modify" area 540, a "Selected Expressions" area 545, an "Alarm Levels" window 550 and a "Conditions will be applied when:" window 555. The "Name" field 530 allows a user to specify a name for the new condition. The "Optional Expressions" area 535 allows a user to select or specify types particular expressions that, when satisfied, can satisfy the condition and/or trigger a consequence. The expressions are used for acquisition of data, analysis of acquired data, and comparison of acquired or analyzed data to a particular model The text of the parameters in the "Optional Expressions" area 535 determines the text of the available fields in the "Modify" area 540. For example, by selecting the "When Maximum of '{p}' in '{v}' is 'larger' than '{v}'" is selected in the "Optional Expressions" area 535, the expressions in quotations become available fields in the "Modify" area 540, namely "p," "v," and "larger." This is also depicted in FIG. 5E. In some embodiments, the user can specify a new expression that is not identified in the "Optional Expressions" area 535.

The "Modify" area 540 includes available fields whose values can be specified by a user according to the desired condition and applicable manufacturing process. The available fields generally represent an event that triggers the consequence of a particular expression or condition. For example, when particular wafer data exceeds an acceptable threshold value calculated using a multi-variate analysis of the data, an expression or condition is satisfied and/or an alarm is triggered, thus implementing the consequence. The user can also specify whether satisfaction of all of the conditions is required to trigger a consequence, or whether satisfaction of any of the conditions suffices to trigger the consequence. In some embodiments, satisfaction of more than one but less than all of the conditions can trigger the consequence.

FIG. 5C depicts the screen 500 after a user has specified values for the fields in the "Name" field 530 and the "Modify" area 540. The user has assigned a name of "NewCondition Name" to the particular condition being specified. As shown in the "Modify" area 540, the filled fields relate to the condition selected from the "Optional Expressions" area 535 and illustrates details about the condition, namely that the user-specified the condition such that "When Maximum of 'VID_899' in '1, 2, 3, 4' is 'larger' than '29,'" the consequence of the condition can be implemented. The user-specified condition is displayed in the "Selected Expressions" area 545 when the user selects the "Add" button 560, as depicted in FIG. 5D.

FIG. 5E illustrates a screen 500 in which a user has selected an additional expression from the "Optional Expressions" area 535 and has specified values for the applicable fields in the "Modify" area 540, namely, "When Transient of '{p}' in '{v}'" is 'smaller' than '{v}' per '{v}' ms." The user has also selected the "Add" button 560, and the user-specified condition appears in the "Selected Expressions" area 545. Both expressions in the "Selected Expressions" area 545 are associated with the condition assigned the name of "NewCondition Name." After the user has selected the appropriate expressions for the condition called "NewCondition name" and specified the values for the fields in the "Modify" area 540, the user determines whether satisfaction of all of the expressions is required to trigger the consequence (e.g., by selecting the radio button 555a in area 555) or whether satisfaction of one of the expressions is required to trigger the consequence (e.g., by selecting the radio button 555b in area 555).

The screen also includes an "Alarm Limits" window 550 that allows the user to define the consequence of the expressions being satisfied. As illustrated in FIG. 5E, the consequence of all of the expressions in area 545 being satisfied (as indicated by selection of the radio button 555a) is a change in the $T^2$ and DModX threshold for triggering a fault condition. As illustrated, the "DModX Warning" has a value of 1, which is increased to a "DmodX Alarm" of 2 upon satisfaction of the expressions. Similarly, the "T2 Warning" value of 1 is increased to a "T2 Alarm" of 2 upon satisfaction of the expressions. Other consequences include, for example, generating a new model based on data acquired for specific wafers. In such an example, the user can specify that the previous n wafers (or batches or lots) are used to generate a model or that the next m wafers (or batches or lots) are to be used to generate a model. Another example of a consequence of an expression being satisfied is the generation, display, transmission, receipt, or retention of a special message indicating the expression or condition is satisfied. Yet another example of a consequence is an instruction to not transmit (or to transmit) an identification of a fault condition. Such an example might occur when an operator is aware that a particular wafer or batch would trigger a fault condition, based on the selected expressions, due to, for example, processing of a first batch after preventive or periodic maintenance. Other consequences will be apparent to those of skill, based on the particular user's application for the invention. Upon the user specifying the name of the new condition, the expressions included in the new condition (along with the values in area 540), the triggering event (in area 555), and the consequence of the condition, the user selects the "Save" button 565. Upon selection of the "Save" button 565, the data and condition are saved and the "Conditions" tab 505 is displayed as depicted in FIG. 5F.

Figure 5F:
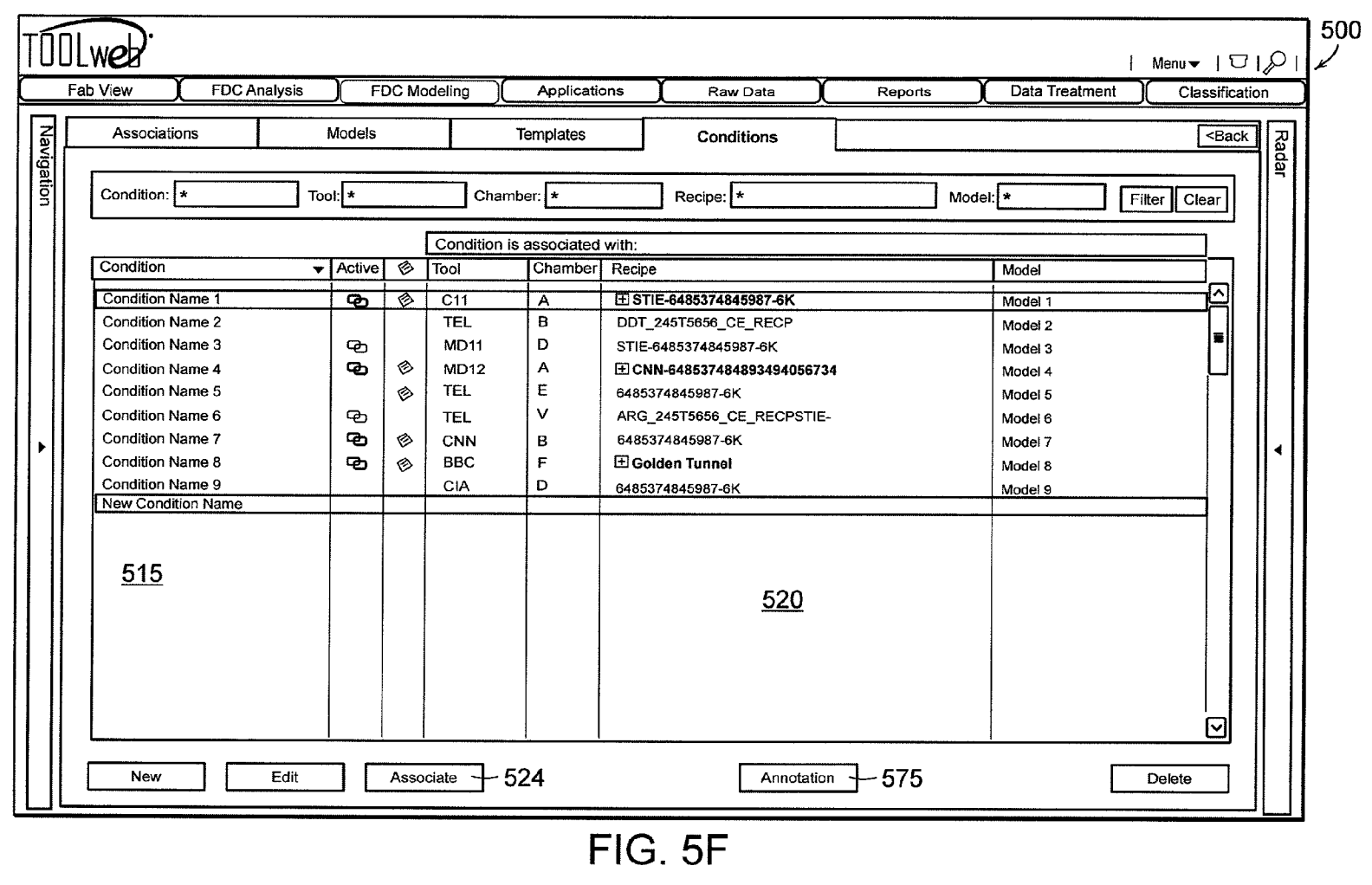

FIG. 5F depicts the screen 500 of FIG. 5A with the newly-created "NewCondition Name" added to the list 515 of Conditions in the "Conditions" tab 505. A user can associate conditions with a model, as discussed above. For example, the user can associate data or parameters from any of the available entries for "Tool," "Chamber," "Recipe," or "Model" available in the "Condition is associated with:" window 520 by selecting the "Associate" button 524. In some embodiments, wafers can be selected automatically for updating or generating a model based on the conditions of the model. When the user selects the "Associate" button 524, the condition association process (not shown) is activated, which associates data from particular tools, chambers, recipes, and/or models with the condition. During wafer processing, data from the particular tool, chamber, or recipe is analyzed, and when the user-defined expression within the condition is satisfied, the consequence is implemented.

Figure 5G:
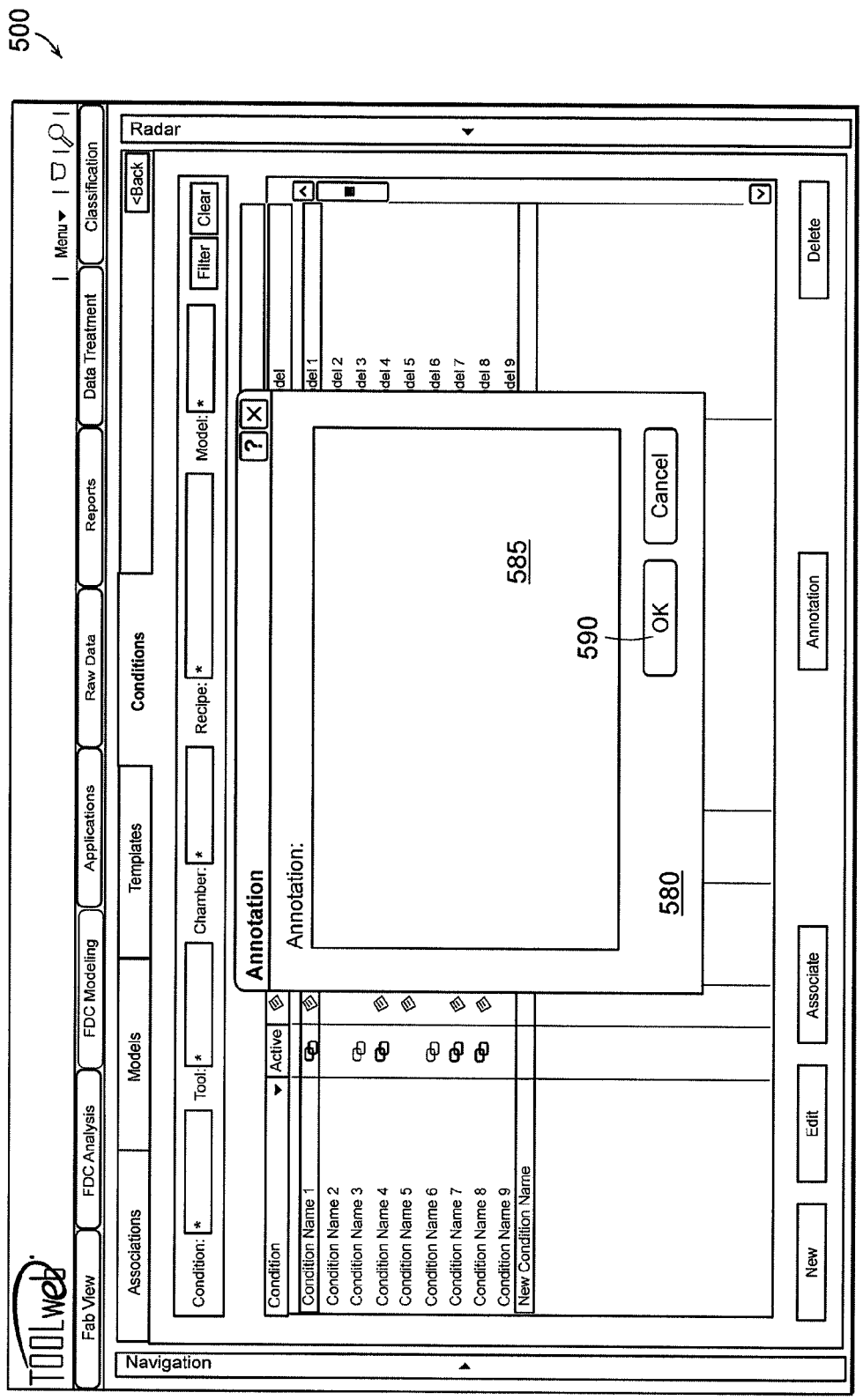

In some embodiments, the user selects the "Annotation" button 575, which opens an "Annotation" window 580, depicted in FIG. 5G. The "Annotation" window 580 allows the user to specify in plain text information in the "Annotation:" field 585 about the particular condition, for example, when the condition is appropriate to use, condition triggers that generate or update a model, or other information. Upon the user selecting the "OK" button 590 in the "Annotation" window 580, the plain text information is associated with the condition and saved.

Figure 6:
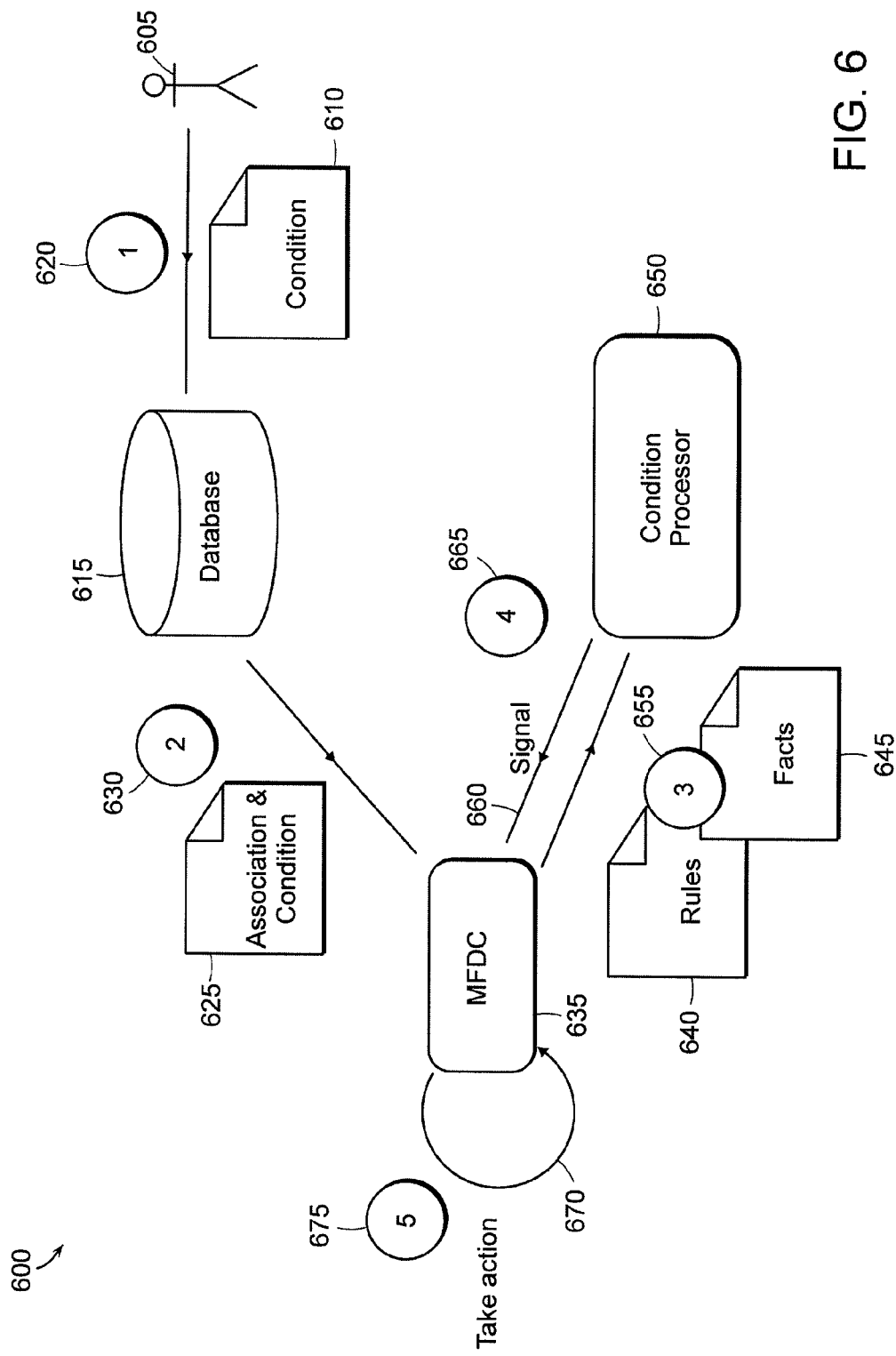
FIG. 6 is a data flow diagram for a system embodying the invention.

FIG. 6 is a data flow diagram 600 for a system embodying the invention. The diagram 600 includes a user 605 providing data about a set of conditions 610 to a database 615 via a first process 620. The set of conditions 610 can be provided, for example, using the user interface depicted in FIGS. 5A-5G. Other user interfaces or visual editors can be used to construct or otherwise specify the set of conditions 610 can also be used without departing from the invention. The set of conditions 610 can be understood, in some embodiments, as a "rule text" that is constructed via a software algorithm or process.

In some embodiments, the database 615 (or a database manager application (not shown)) can store and retrieve any of the set of conditions 610. Data is associated with the set of conditions to form a data file 625 called "Association & Condition" via a second process 630. For example, data from or about a tool, chamber, recipe, or model can be associated with the set of conditions to generate the data file 625. An exemplary process for generating the data file is depicted in FIG. 5F. In some embodiments, the structure or content of the data file 625 is determined using a multivariate analysis. The database can be used to configure portions of the multivariate analysis to update or modify the process by which conditions are associated with tools, chambers, recipes, or models (e.g., sometimes called the "association structure").

The second process 630 also involves communicating the data file 625 to a Multivariate Fault Detection and Classification ("MFDC") module 635. In some embodiments, the MFDC module 635 is included in the system 100 of FIG. 1. In some embodiments in which the database 615 modifies the association structure, the MFDC module 635 processes data using the modified association structure. The data file 625 is used by the MFDC module 635 to form a set of rules 640 that associated with the set of conditions 610 via, for example, a "rules engine" (not shown). The rules engine converts the data file from conditions and associations to rules usable by other modules in the system. For example, the set of rules 640 defines the parameters representative of a particular condition of the set of conditions 610 being satisfied. Data from the processing facility (e.g., the processing facility 115 of FIG. 1) can be assembled as a set of facts 645. The set of rules 640 and the set of facts 645 are communicated to a condition processor 650 via a third process 655.

Based on the set of facts 645, the condition processor 650 determines whether a rule from the set of rules 640 has been satisfied (e.g., whether a particular user-specified condition has been met). The condition processor 650 communicates a signal 660 to the MFDC module 635 via a fourth process 665. Based on the signal 660, the MFDC module 635 can perform an action 670 (e.g., "Take action") via a fifth process 675. In some embodiments, the action 670 involves generating a new model or updating an existing model, for example, as discussed above using a template and data acquired during the manufacturing process. Updating a model involves, for example, changing or adjusting parameter values, for example, to account for limits imposed by particular conditions. In some embodiments, the action 670 involves not changing the model being used. In some embodiments, the MFDC module 635 can identify or mark data (e.g., wafers) that satisfy a particular condition or rule for subsequent display via a user interface (e.g., via the user interface depicted in FIGS. 3A-3C).

Figure 7A:
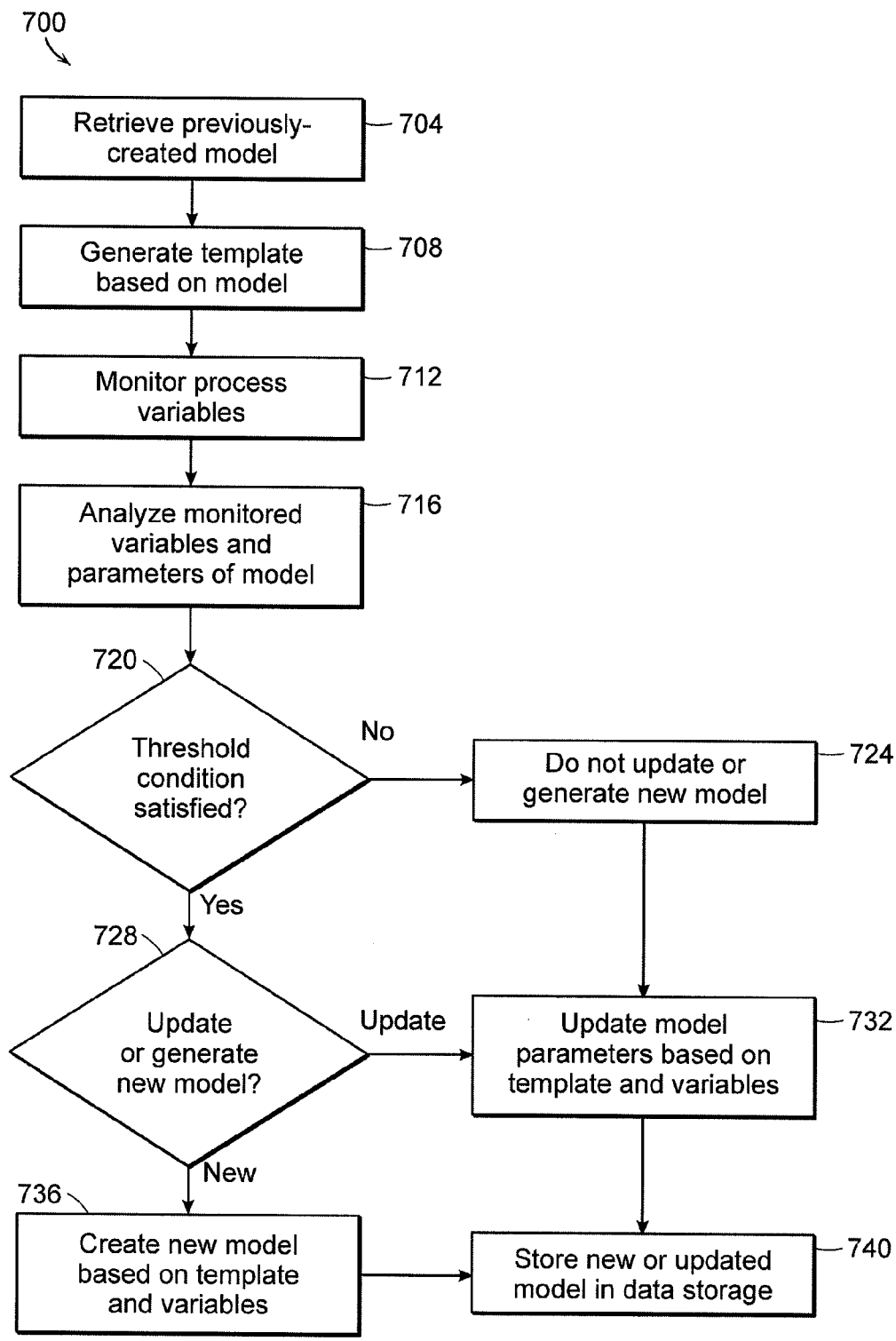
FIG. 7A is a flow chart illustrating a process for generating a new model or updating an existing model from a template, according to an illustrative embodiment of the invention.

FIG. 7A is a flow chart 700 illustrating a process for generating a new model or updating an existing model from a template, according to an illustrative embodiment of the invention. The process involves retrieving a previously-created model (step 704). In some embodiments, the previously-created model is retrieved from a data storage or database. The previously-created model can also be retrieved from a cache or "basket" when, for example, the user has a selected the desired model and/or desired wafers to be used for generating the new model or updating the model. After the previously-created model is retrieved, a template is generated from the model (step 708). The template includes information from the model (e.g., the values for process variables or physical parameters associated with a manufacturing process).

During a manufacturing process, process variables are monitored (step 712). The particular process variables can be user-selected. In some embodiments, the particular model or template determines which process variables are monitored. For example, when the model specifies a value for a particular process variable, data associated with that variable is monitored during the manufacturing process. Additionally, variables that are not specified in the model can also be monitored so that, for example, a new or updated model can account for the previously-unspecified variables. The monitored data can be pre-processed prior to further analysis. In step 716, the monitored data and the parameters specified in the model are analyzed using a statistical analysis process. In some embodiments, the statistical analysis process involves a multivariate statistical analysis such as, for example, a Hotelling-type analysis, a DModX-type analysis, a principal component analysis-type analysis, a weighted moving average-type analysis (including an exponential weighted moving average-type analysis), or combinations thereof. For example, in some embodiments, the monitored data is analyzed using both the Hotelling-type analysis and the DModX-type analysis.

The process also involves a determination, based on the analysis of the monitored variables and the parameters of the model, whether a condition has been satisfied (step 720). Where a condition has not been satisfied, no new model is generated and the model in use is not updated (step 724). For example, step 724 occurs when monitored data associated with the processed wafer falls within an acceptable limit (e.g., the data conforms to the values specified in the model). In some embodiments, step 724 occurs when the monitored data associated with the processed wafer falls outside an acceptable limit (e.g., the data does not conform to the values specified in the model).

If the condition is satisfied, the process proceeds to step 728, which involves a determination about whether to generate a new model or update the previously-generated model. In some embodiments, a new model is generated based on the result of the statistical analysis (steps 716-720). In some embodiments, when a multivariate analysis of the monitored data results in a value that exceeds a threshold value, a new model is generated (step 736) because, for example, the monitored data may significantly differ from the model in terms of actual values of physical parameters. In particular, the new model can be used when a new process tool or chamber is used that is similar in operation or processing to already existing process tools or chambers, or process tools or chambers with known or previously-generated models.

In step 732, the previously-generated model is updated based on the template and the monitored data. For example, where the monitored data differs, but not significantly, from the model, and the variables monitored are specified in the model, the model is updated by updating the parameter values the model specifies. The updated model can, for example, reflect changed conditions within the particular processing tool or chamber. The changed conditions can result from, for example, preventive or periodic maintenance performed on the processing tool or chamber or based on the passage of time and the number of wafers processed exceeding a specified value. In step 740, the updated model (step 732) or the new model (step 736) is stored in a data storage (e.g., a database, cache module, or a basket).

FIG. 7B is a flow chart 752 illustrating a process for determining whether a threshold condition is satisfied. The process illustrated in FIG. 7B can be, for example, carried out during step 720 and/or step 716 in FIG. 7A. In step 756, process variables are acquired (e.g., from the outputs 125 or the data acquisition module 130 shown in FIG. 1). The process variable data is then pre-processed (step 760) for further analysis. In some embodiments, step 760 is optional or omitted. Examples of pre-processing data includes framing, performing data reduction, weighting, scoring, buffering, multiplexing, formatting, or translating the data.

The process also involves selecting a type of multivariate analysis to perform on the acquired data (step 764). The type of multivariate analysis selected can be determined by a user (e.g., via the user interface 110 of the system 100 of FIG. 1). The multivariate analysis type selected can also be determined automatically (e.g., based on the parameters of the model and/or template). As illustrated, four types of multivariate analysis are available for selection in step 768: a Hotelling-type analysis (768a), a DModX-type analysis (768b), a principal component analysis-type analysis (768c), and a weighted moving average-type calculation (768, illustrated as an exponential weighted moving average-type calculation). Other types of multivariate analyses can be selected, if appropriate, based on the user's preference, the data collected, and/or the type of process tool, chamber, or recipe from which data is collected.

In some embodiments, the type of multivariate analysis is selected based on the type of data or the pre-processed data. For example, if insufficient data (or insufficiently grouped data) exists to perform a DModX-type calculation, a DModX calculation is not selected. Similarly, if the data is not suitable for or amenable to Hotelling-type analyses, principal component-type analyses, or exponentially weighted moving average-type analyses, such analyses are not selected. In step 772, a threshold value is selected based on the type of multivariate analysis selected in step 768. For example, if the Hotelling-type analysis (768a) is selected, a $T^2_{threshold}$ score is selected, having a particular value. If the DModX-type analysis (768b) is selected, a $DModX_{threshold}$ score is selected, having a particular value. $DModX_{threshold}$ can have the same value as $T^2_{threshold}$, but is not required to. The threshold value can be selected by the user or automatically (e.g., by the model 135 or template 150 in FIG. 1).

After the threshold value is selected, in step 776, the multivariate analysis is performed on the acquired data, and a score or multivariate analysis value is generated based on the multivariate analysis selected. For example, for a Hotelling-type analysis (768a), a $T^2$ score is generated. After the multivariate analysis value is generated, the value is compared to the threshold value for the particular multivariate analysis type. If the generated score exceeds the threshold value (step 784), then the threshold condition is satisfied (e.g., illustrated in step 728 of FIG. 7A). If the generated score does not exceed the threshold value (step 788), the threshold condition is not satisfied (e.g., illustrated in step 724 of FIG. 7A). It will be understood that the score exceeds the threshold value is based on the circumstances of the particular calculation. For example, in some embodiments, the score exceeds the threshold value when the score is greater than or equal to the threshold value (e.g., where the threshold value is an upper limit or boundary). Moreover, the score can exceed the threshold value when the score is below the threshold value (e.g., where the threshold value is a lower limit or boundary)

In some embodiments, multiple types of multivariate analysis are selected in step 768 as a group (e.g., a Hotelling-type analysis (768a) and a DModX-type analysis (768b)). In such embodiments, by way of example, a threshold condition can be satisfied if the value or score resulting from any one of the multivariate analyses (e.g., either the $T^2$ score or the DModX score) exceeds a threshold value associated with the particular multivariate analysis of the group selected (e.g., $T^2_{threshold}$ or $DModX_{threshold}$, respectively). As an additional example, a threshold condition can be satisfied when the value resulting from each of the multivariate analyses (e.g., both the $T^2$ score and the DModX score) exceeds the threshold value associated with the particular multivariate analysis selected (e.g., $T^2_{threshold}$ or $DModX_{threshold}$, respectively). In yet another embodiment, a threshold condition is satisfied when the value resulting from more than one but less than all of the multivariate analyses exceeds a threshold value associated with the particular multivariate analysis selected.

The above-described techniques can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions described herein by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display or other flat-screen) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks, also referred to as communications channels, include a local area network ("LAN") and a wide area network ("WAN"), e.g., the Internet, and include both wired and wireless networks. In some examples, communications networks can feature virtual networks or sub-networks such as a virtual local area network ("VLAN"). Unless clearly indicated otherwise, communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

Various embodiments are depicted as in communication or connected by one or more communication paths. A communication path is not limited to a particular medium of transferring data. Information can be transmitted over a communication path using electrical, optical, acoustical, physical, thermal signals, or any combination thereof. A communication path can include multiple communication channels, for example, multiplexed channels of the same or varying capacities for data flow.

Multiple user inputs can be used to configure parameters of the depicted user interface features. Examples of such inputs include buttons, radio buttons, icons, check boxes, combo boxes, menus, text boxes, tooltips, toggle switches, buttons, scroll bars, toolbars, status bars, windows, or other suitable icons or widgets associated with user interfaces for allowing a user to communicate with and/or provide data to any of the modules or systems described herein.

The invention has been described in terms of particular embodiments. The alternatives described herein are examples for illustration only and not to limit the alternatives in any way. The steps of the invention can be performed in a different order and still achieve desirable results.

The invention claimed is:

1. A multivariate analytical system comprising:
a processor;
a template-generating module in communication with the processor to generate a first template based on a previously-created model that includes a first set of parameters defining at least a portion of a manufacturing process;
a data acquisition module in communication with a processing tool to acquire or monitor one or more variables during the manufacturing process and provide information associated with the one or more variables to a model-generating module;
the model-generating module to generate a new model having a second set of parameters, the new model being generated according to a statistical analysis based on the first template and the one or more variables upon the one or more variables satisfying a threshold condition, wherein the one or more variables satisfy the threshold condition when the statistical analysis of the one or more variables results in a value that exceeds a threshold value; and
a basket or cache module to provide data to the model-generating module or the template-generating module in response to a user selection or the one or more variables satisfying the threshold condition.

2. The system of claim 1, wherein the one or more variables to be monitored are specified by a user.

3. The system of claim 1, wherein the threshold condition is specified by a user.

4. The system of claim 1, wherein any of the one or more variables satisfying the threshold condition triggers creating the new model.

5. The system of claim 1, wherein the one or more variables comprise time, occurrence of periodic or preventive maintenance, a result of metrology verification, a number of wafers processed, or any combination thereof.

6. The system of claim 1, wherein the multivariate statistical analysis involves a Hotelling-type calculation, a DModX-type calculation, a principal component analysis-type calculation, a weighted moving average-type calculation, or any combination thereof.

7. The system of claim 1, wherein the new model specifies parameters for a process tool, chamber, or recipe from which the one or more variables were monitored or for a second process tool, chamber, or recipe.

8. The system of claim 1, wherein the first set of parameters comprise metrology, time, duration of use of a process tool, number of wafers processed, occurrence of periodic or preventive maintenance, sequence of wafers processed, or any combination thereof.

9. The system of claim 1 wherein the statistical analysis is a multivariate statistical analysis.

10. The system of claim 9, wherein the multivariate statistical analysis involves a Hotelling-type calculation, a DModX-type calculation, a principal component analysis-type calculation, a weighted moving average-type calculation, or any combination thereof.

11. A multivariate analytical system comprising:
a processor;
a template-generating module in communication with the processor to generate a first template based on a previously-created model that includes a first set of parameters defining at least a portion of a manufacturing process;
a data acquisition module in communication with a processing tool to acquire or monitor one or more variables during the manufacturing process and provide information associated with the one or more variables to a model-generating module;
the model-generating module to generate a new model having a second set of parameters, the new model being generated according to a statistical analysis based on the first template and the one or more variables upon the one or more variables satisfying a threshold condition, wherein the one or more variables satisfy the threshold condition when the statistical analysis of the one or more variables results in a value that exceeds a threshold value, wherein the new model comprises the previously-created model and the second set of parameters comprises the values of the first set of parameters adjusted based on the template and the one or more variables.

12. A multivariate analytical system comprising:
a processor;
a template-generating module in communication with the processor to generate a first template based on a previously-created model that includes a first set of parameters defining at least a portion of a manufacturing process;
a data acquisition module in communication with a processing tool to acquire or monitor one or more variables during the manufacturing process and provide information associated with the one or more variables to a model-generating module;
the model-generating module to generate a new model having a second set of parameters, the new model being generated according to a statistical analysis based on the first template and the one or more variables upon the one or more variables satisfying a threshold condition, wherein the one or more variables satisfy the threshold condition when the statistical analysis of the one or more variables results in a value that exceeds a threshold value; and
a user interface including:
(a) a first area including one or more fields available for input of information by a user, the information corresponding to a value of a parameter of the template, and the first area including a command portion in communication with the template-generating module for, in response to the user selecting the command portion, issuing a command to create the template;
(b) a second area displaying one or more unique identifiers associated with each of a set of wafers having one or more data values, the one or more unique identifiers selectable by the user;
(c) a third area for displaying a subset of the one or more unique identifiers corresponding to a subset of wafers selected by the user;
(d) a fourth area in communication with the model-generating module for at least one of creating the new model or updating the previously-created model in response to the user selecting the fourth area, wherein the new model is created or the previously-created model is updated according to a statistical analysis based on the template and the one or more data values associated with the subset of wafers.

13. The system of claim 12, wherein the user interface further comprises:
(e) a fifth area having one or more conditions selectable by the user; and
an analyzer module in communication with the fifth area and the model-generating module for, upon determining that the one or more user-selectable conditions have been satisfied, communicating a signal to the model-generating module to create the new model or update the previously-created model.

* * * * *